(12) United States Patent
Ambale Srinivasamurthy et al.

(10) Patent No.: US 11,777,815 B1
(45) Date of Patent: Oct. 3, 2023

(54) TECHNIQUES FOR DYNAMICALLY CONFIGURING SERVICE AVAILABILITY

(71) Applicant: ServiceNow, Inc., Santa Clara, CA (US)

(72) Inventors: Padmaprabodh Ambale Srinivasamurthy, Cupertino, CA (US); Bina Sunil Patel, San Jose, CA (US); Hardik Hasmukhbhai Tank, Hyderabad (IN); Chao Zhang, Fremont, CA (US); Nikhil Pragna Kurama, Hyderabad (IN); Amithkumar Manoharan Chithambaram, Milpitas, CA (US); Milind Hemant Gokhale, San Jose, CA (US); Venkat Narasimhalu, San Ramon, CA (US); Shurui Li, Sunnyvale, CA (US); Karthik Keshavamurthy, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/685,045

(22) Filed: Mar. 2, 2022

(51) Int. Cl.
*H04L 41/5006* (2022.01)
*H04L 41/5061* (2022.01)
(Continued)

(52) U.S. Cl.
CPC .......... *H04L 41/5006* (2013.01); *H04L 41/22* (2013.01); *H04L 41/5019* (2013.01); *H04L 41/5061* (2013.01)

(58) Field of Classification Search
CPC ................ H04L 41/5006; H04L 41/22; H04L 41/5019; H04L 41/5061
(Continued)

(56) References Cited

U.S. PATENT DOCUMENTS 6,609,122 B1  8/2003  Ensor
6,678,887 B1  1/2004  Hallman
(Continued)

FOREIGN PATENT DOCUMENTS

WO    WO-0075788 A1 * 12/2000 ............. H04L 12/24

OTHER PUBLICATIONS

R. Alsurdeh, R. N. Calheiros, K. M. Matawie and B. Javadi, "Hybrid Workflow Scheduling on Edge Cloud Computing Systems," in IEEE Access, vol. 9, pp. 134783-134799, 2021, doi: 10.1109/ACCESS.2021.3116716. (Year: 2021).*

(Continued)

*Primary Examiner* — Melvin H Pollack
(74) *Attorney, Agent, or Firm* — FLETCHER YODER PC

(57) ABSTRACT

A cloud-based platform may receive an indication of one or more event associated with a service provider and modify a configuration associated with providing a schedule of respective service appointments offered by the service provider based on the indication of the one or more events. The cloud-based platform may then receive a request for a new service appointment after modifying the configuration and in response to receiving the request for the new service appointment, determine a number of scheduled appointments associated with a first time window, determine whether the number of scheduled appointments is less than a maximum number of appointments associated with the first time window, and automatically schedule the new service appointment during the first time window in response to determining that the number of scheduled appointments is less than the maximum number of appointments associated with the first window.

20 Claims, 14 Drawing Sheets

(51) Int. Cl.
*H04L 41/5019* (2022.01)
*H04L 41/22* (2022.01)

(58) Field of Classification Search
USPC .................................................. 709/224
See application file for complete search history.

(56) References Cited

U.S. PATENT DOCUMENTS

| | | | |
|---|---|---|---|
| 7,020,706 | B2 | 3/2006 | Cates |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,350,209 | B2 | 3/2008 | Shum |
| 7,463,939 | B1 * | 12/2008 | Mata .................. G06Q 10/10 700/103 |
| 7,587,327 | B2 * | 9/2009 | Jacobs ................ G06Q 10/10 705/7.14 |
| 7,610,512 | B2 | 10/2009 | Gerber |
| 7,617,073 | B2 | 11/2009 | Trinon |
| 7,689,628 | B2 | 3/2010 | Garg |
| 7,783,744 | B2 | 8/2010 | Garg |
| 7,890,802 | B2 | 2/2011 | Gerber |
| 7,930,396 | B2 | 4/2011 | Trinon |
| 7,945,860 | B2 | 5/2011 | Vambenepe |
| 7,966,398 | B2 | 6/2011 | Wiles |
| 8,051,164 | B2 | 11/2011 | Peuter |
| 8,224,683 | B2 | 7/2012 | Manos |
| 8,266,096 | B2 | 9/2012 | Navarrete |
| 8,457,928 | B2 | 6/2013 | Dang |
| 8,478,569 | B2 | 7/2013 | Scarpelli |
| 8,660,856 | B2 * | 2/2014 | Lassetter ............ G16H 40/20 705/2 |
| 8,674,992 | B2 | 3/2014 | Poston |
| 8,689,241 | B2 | 4/2014 | Naik |
| 8,743,121 | B2 | 6/2014 | De Peuter |
| 8,887,133 | B2 | 11/2014 | Behnia |
| 8,983,982 | B2 | 3/2015 | Rangarajan |
| 9,065,783 | B2 | 6/2015 | Ding |
| 9,122,552 | B2 | 9/2015 | Whitney |
| 9,239,857 | B2 | 1/2016 | Trinon |
| 9,508,051 | B2 | 11/2016 | Falk |
| 9,535,674 | B2 | 1/2017 | Cooper |
| 9,535,737 | B2 | 1/2017 | Joy |
| 9,557,969 | B2 | 1/2017 | Sharma |
| 9,792,387 | B2 | 10/2017 | George |
| 10,475,263 | B1 * | 11/2019 | Heller .................. G07C 9/38 |
| 10,726,644 | B2 * | 7/2020 | Abari .................. G06N 20/00 |
| 11,157,882 | B1 * | 10/2021 | Liu ..................... G06Q 10/00 |
| 11,201,794 | B1 * | 12/2021 | Guo .................... H04L 43/0864 |
| 11,296,971 | B1 * | 4/2022 | Jain .................... H04L 41/22 |
| 11,348,448 | B1 * | 5/2022 | Adams ................ H04L 43/045 |
| 11,354,150 | B1 * | 6/2022 | Guo .................... H04L 41/082 |
| 11,481,705 | B1 * | 10/2022 | Wozniak ........ G06Q 10/06316 |
| 11,528,197 | B1 * | 12/2022 | Youssef .............. H04L 41/5048 |
| 11,538,112 | B1 * | 12/2022 | Singh .................. G06Q 40/08 |
| 2001/0049619 | A1 * | 12/2001 | Powell ............ G06Q 10/063112 705/7.16 |
| 2004/0158486 | A1 * | 8/2004 | Nudd ................ G06Q 10/1095 705/7.29 |
| 2008/0167937 | A1 * | 7/2008 | Coughlin ............ G06Q 10/1093 705/7.19 |
| 2010/0049576 | A1 * | 2/2010 | Wilson ............ G06Q 10/063114 705/7.14 |
| 2015/0142602 | A1 * | 5/2015 | Williams ............ G06Q 30/0631 705/26.7 |
| 2016/0292369 | A1 * | 10/2016 | Lakare .................... G16Z 99/00 |
| 2017/0024704 | A1 | 1/2017 | Tompkins et al. |
| 2017/0317874 | A1 * | 11/2017 | Borah .................. H04L 47/41 |
| 2018/0218338 | A1 * | 8/2018 | Hengerer .......... G06F 16/24575 |
| 2019/0102746 | A1 | 4/2019 | Gupta et al. |
| 2019/0267122 | A1 * | 8/2019 | Raghuvanshi ......... G16H 10/60 |
| 2019/0355077 | A1 * | 11/2019 | Ahmed ............... H04N 5/23238 |
| 2020/0265387 | A1 * | 8/2020 | Ave .................... G06Q 10/1095 |
| 2020/0342981 | A1 * | 10/2020 | Kaufman ............ G06Q 10/1095 |
| 2021/0319408 | A1 * | 10/2021 | Jorasch ............... G06Q 10/1095 |
| 2022/0232579 | A1 * | 7/2022 | Lee ...................... H04L 67/141 |
| 2022/0239578 | A1 * | 7/2022 | Raleigh ................ H04L 65/80 |
| 2022/0358468 | A1 * | 11/2022 | Fornell .................. G06Q 50/28 |
| 2022/0359068 | A1 * | 11/2022 | Abdulkarim ......... G16H 10/40 |
| 2022/0360494 | A1 * | 11/2022 | Chunduru Venkata ...................... H04L 41/0873 |

OTHER PUBLICATIONS

Singh, R., & Singh, R. Nature Inspired Job Scheduling For E-Health Services In Mobile Cloud Computing. International Journal of Computer Applications & Information Technology, 11. 2019. (Year: 2019).*

Halang, C. & Schirmer, M., (2012). Towards a user-centred planning algorithm for automated scheduling in mobile calendar systems. In: Goltz, U., Magnor, M. Appelrath, H.-J., Matthies, H. K., Balke, W.-T. & Wolf, L. (Hrsg.), Informatik 2012. Bonn: Gesellschaft für Informatik e.V.. (S. 1857-1863) (Year: 2012).*

S. Sankarananrayanan and S. M. A. Wani, "NFC enabled intelligent hospital appointment and medication scheduling," 2014 2nd International Conference on Information and Communication Technology (ICoICT), 2014, pp. 24-29, doi: 10.1109/ICoICT .2014. 6914034. (Year: 2014).*

* cited by examiner

FIG. 8

- 400
- 454
- 456 — *NAME
- 458 — DESCRIPTION
- 460 — HOLIDAY SCHEDULE
- 462 — *APPOINTMENT DURATION — NONE —
- LEAD TIME: DAYS 0 HOURS 04 00
- 464
- 466 — FUTURE BOOKABLE MAX DAYS: 14
- RESCHEDULE/CANCEL BY TIME: DAYS 0 HOURS 00 00
- 468 — ACTIVE ☑
- 470
- SUBMIT
- VACCINATION APPOINTMENT CONFIGURATION NEW RECORD
- SUBMIT

TECHNIQUES FOR DYNAMICALLY CONFIGURING SERVICE AVAILABILITY

BACKGROUND

The present disclosure relates generally to providing a flexible system for fulfilling demand for one or more services provided by a service provider and, more specifically, dynamically configuring an availability of such services in response to various changes associated with the provision of such services.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Organizations may utilize cloud-based PaaS to provide particular services to customers. For instance, customers may be able to access a portal associated with a cloud-based PaaS of an organization to schedule one or more services provided by the organization to the customers and/or to access one or more resources of the organization. However, after a customer has scheduled a time for receiving a service provided by the organization or for accessing a resource of the organization, changes to the availability of the service or resource may occur. For instance, the available or allotted resources for providing the service may increase or decrease or the timing of providing the service may change.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The presently disclosed techniques relate to providing a flexible system for fulfilling demand for one or more services provided by a service provider. In particular, an administrator associated with the service provider may generate one or more configurations associated with providing the services at one or more locations during one or more time periods. After the administrator has generated such configurations, the system may generate one or more appointment slots based on the configurations. Such appointment slots may then be displayed to a customer of the service provider via a portal such that the customer may schedule an appointment to receive a service in one or more of the appointment slots.

Additionally, after one or more customers have scheduled appointments for receiving a service in respective appointment slots, one or more events may occur that affect the availability of resources for providing a particular service or the timing for providing the particular service. For instance, such events may include an increase or a decrease in a number of personnel available to provide the service to the customers, an increase or decrease in the time for providing the service in a particular time period, an increase or a decrease in the duration of the appointment slots for providing the service, a change in the start time or the end time of the appointment slots for providing the service, an increase or a decrease in the number of appointment slots available during a particular time period, or the like. In response to receiving an indication of an occurrence of one or more events, the system may dynamically modify one or more configurations generated by the administrator that govern provision of the services to accommodate the occurrence of the events. In certain embodiments, the system may honor or maintain existing appointments made by customers before the system received the indication of the occurrence of the events while the system dynamically modifies the configurations generated by the administrator to automatically prevent overbooking or underbooking of new appointments made by customers after the system received the indication of the occurrence of the events. In this way, the system may automatically modify configurations for providing services to customers in appointment slots without manual intervention.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 8 illustrates a window of the exemplary GUI of FIG. 5 for customizing a new configuration or editing an existing configuration associated with the particular program and/or the particular center, in accordance with aspects of the present disclosure;

DETAILED DESCRIPTION

Figure 1:
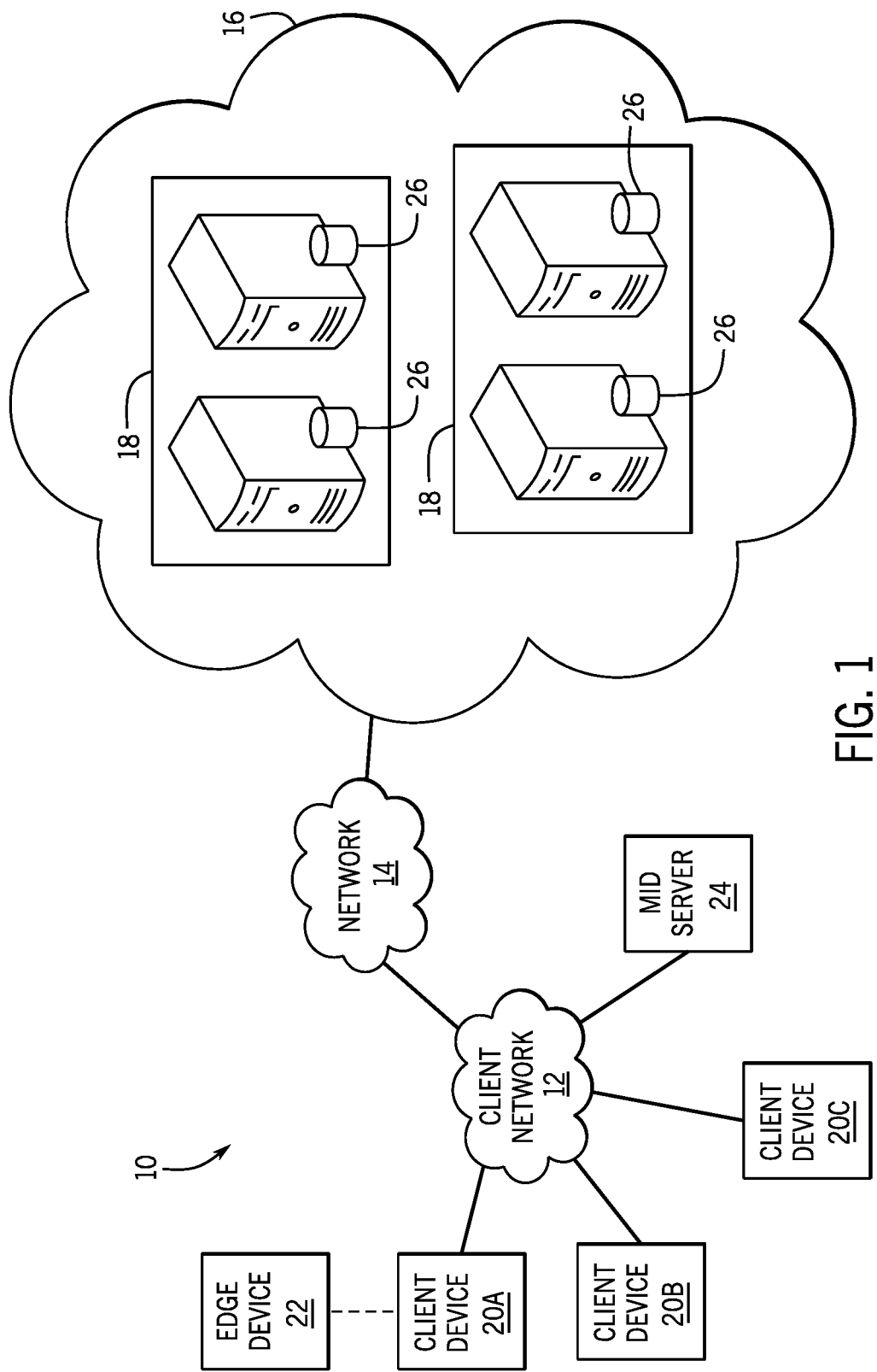
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "service" refers to any service that may be provided to a customer during a period of time reserved for the customer. For instance, a service may include administering a vaccination, a healthcare visitation, a product repair, a car repair, a house repair, an installation of a product, a cosmetic visitation, tutoring, or the like. Additionally, a service may be provided in various fields, including knowledge or consulting, information technology, design, performing arts and entertainment, creative, government, non-profit, education, childcare, construction, maintenance, cleaning, professional, financial, brokering, healthcare, wellness, personal grooming, sports, fitness, hospitality, transport, utilities, insurance, food, beverages, night economy, rentals, event services, club goods, or the like.

As mentioned above, organizations may utilize cloud-based PaaS to provide particular services to customers. For instance, customers may be able to access a portal associated with a cloud-based PaaS of an organization to schedule one or more services provided by the organization to the customers and/or access one or more resources of the organization. However, after a customer has scheduled a time for receiving a service provided by the organization or accessing a resource of the organization, changes to the availability of the service or resource may occur. For instance, the resources for providing the service may increase or decrease or the timing of providing the service may change.

Additionally, conventional processes of manually scheduling services may be inflexible and tedious. That is, customers may schedule a particular service during an appointment slot. However, the appointment slot may have a fixed start time, a fixed end time, and/or a fixed duration that cannot be adjusted if any circumstances arise that might affect such attributes. In some case, such fixed appointment scheduling may cause cancelations on behalf of either the customer or the organization because the change of circumstances affects the ability of the customer to attend the appointment and/or the service personnel of the organization to provide the service during the scheduled appointment time.

Accordingly, the presently disclosed techniques relate to providing a flexible system for fulfilling demand for one or more services provided by a service provider. In particular, an administrator associated with the service provider may generate one or more configurations associated with providing the one or more services at one or more locations during one or more time periods. After the administrator has generated such configurations, the system may generate one or more appointment slots based on the configurations. Such appointment slots may then be displayed to a customer of the service provider via a portal such that the customer may schedule an appointment to receive a service in one or more of the appointment slots.

Additionally, after one or more customers have scheduled appointments for receiving a service in respective appointment slots, one or more events may occur that affect the availability of resources for providing a particular service or the timing for providing the particular service. For instance, such events may include an increase or a decrease in a number of personnel available to provide the service to the customers, an increase or decrease in the time for providing the service in a particular time period, an increase or a decrease in the duration of the appointment slots for providing the service, a change in the start time or the end time of the appointment slots for providing the service, an increase or a decrease in the number of appointment slots available during a particular time period, or the like. In response to receiving an indication of an occurrence of one or more events, the system may dynamically modify one or more configurations generated by the administrator that govern provision of the services to accommodate the occurrence of the events. In certain embodiments, the system may honor or maintain existing appointments made by customers before the system received the indication of the occurrence of the events while the system dynamically modifies the configurations generated by the administrator to automatically prevent overbooking or underbooking of new appointments made by customers after the system received the indication of the occurrence of the events. In this way, the system may automatically modify configurations for providing services to customers in appointment slots without manual intervention.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to the figures, FIG. 1 illustrates a schematic diagram of an embodiment of a cloud computing system 10 where embodiments of the present disclosure may operate. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
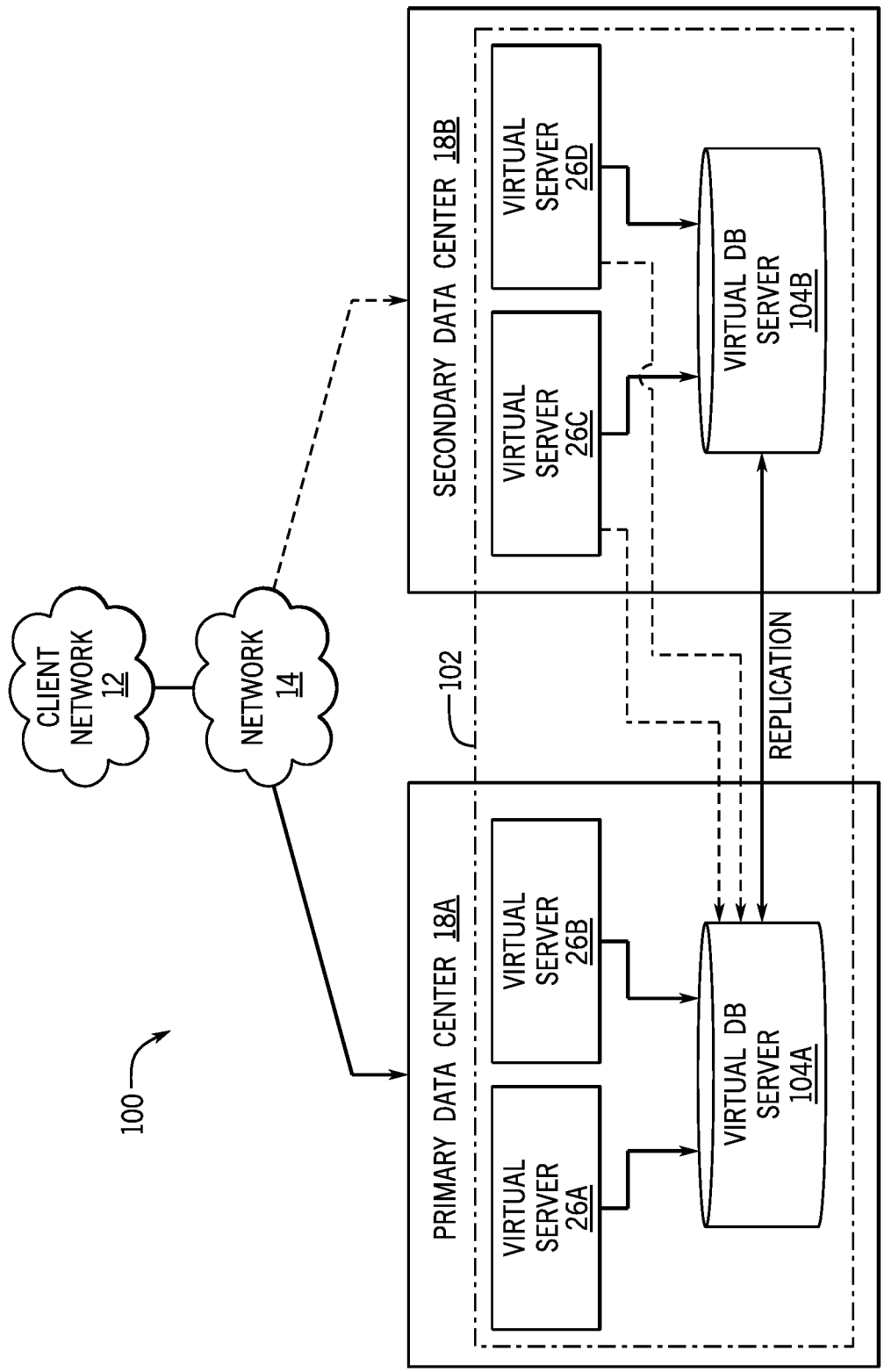
FIG. 2 is a block diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
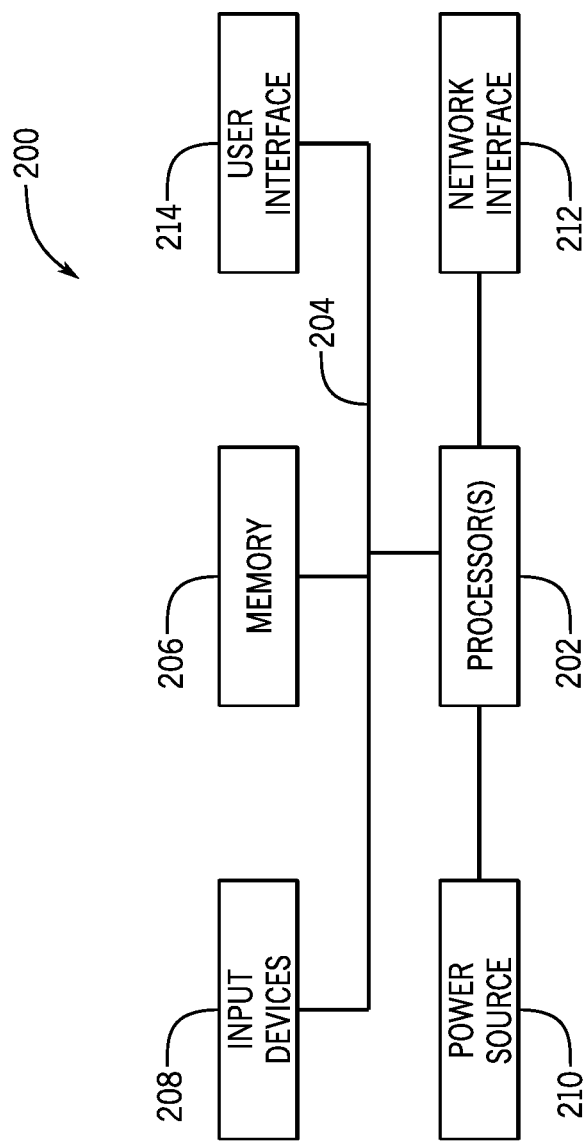
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
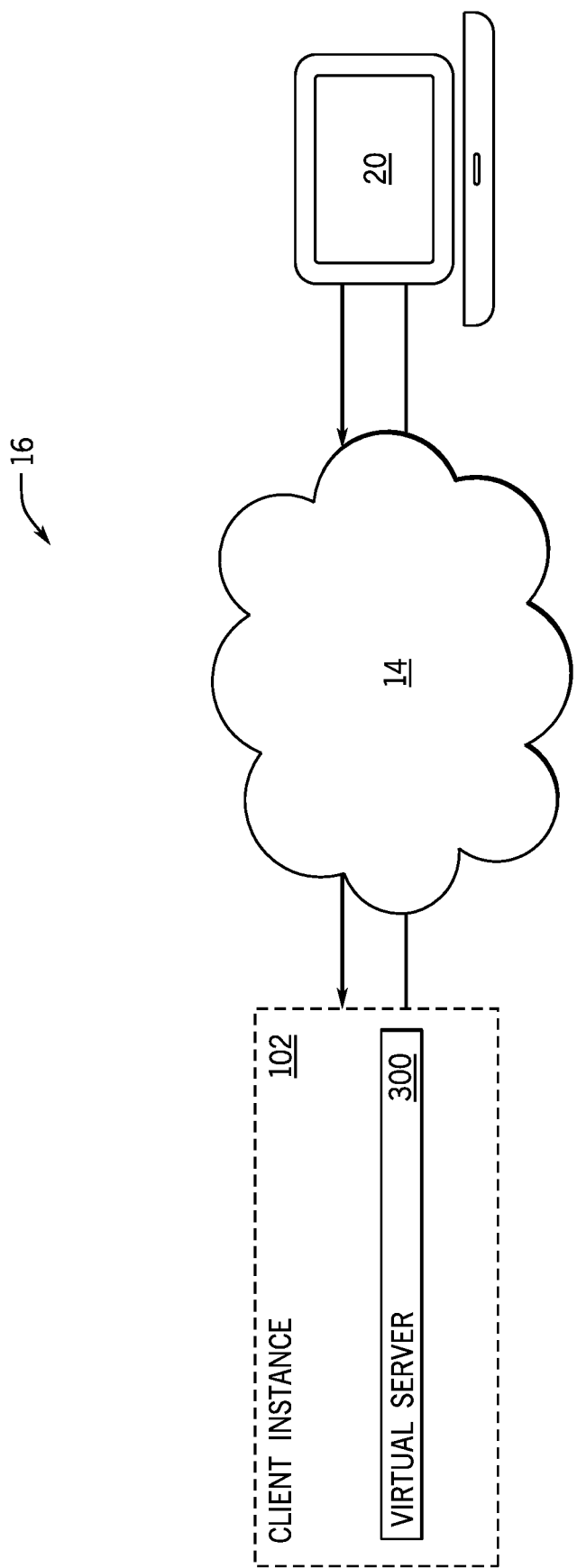
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

With the preceding in mind, the cloud-based platform 16 may provide a graphical user interface for a service configuration application. In particular, the service configuration application may allow an administrator associated with a service provider to customize one or more configurations that may be applied by a system to provide appointment slots to potential customers at one or more service locations for receiving a service. For instance, a particular service location may provide one or more types of services offered by the service provider at a particular geographical location. The administrator may customize a configuration for one or more service locations via the service configuration application that specifies a particular schedule for providing one or more services to the potential customers. For instance, the schedule may specify which days the service location is open or closed for providing the services during the week, which dates the service location may be closed due to holidays, service provider-specific closures, or the like, an opening time that defines when the service location is open on a respective day, a closing time that defines when the service location is closed on a respective day, or the like. The administrator may also customize the configuration to define how many appointment slots are available throughout the day, the duration of each appointment slot available during a particular day, or the like. In this way, the service configuration application provides the administrator with tools to customize each configuration with a high degree of granularity.

Additionally, the administrator may define a start date and/or time and an end date and/or time that specifies when the configuration is applied by the system to the corresponding service location. For instance, the administrator may customize different configurations for a particular service location such that a first configuration applies to the service location during a first period of time and a second configuration applies to the service location during a second period of time that is different than the first period of time. In this way, the system may apply each configuration in a specified order to each corresponding service location in accordance with the start date and/or time and the end date and/or time associated with each configuration. As such, the service configuration application provides the administrator with a highly flexible system to customize various configurations for providing appointment slots to potential customers for receiving one or more services from a service provider at particular service locations with a high degree of granularity.

After the administrator has customized one or more configurations for providing appointment slots to potential customers at one or more service locations, the system may apply the configurations to the service locations. In particular, the system may generate and/or update a graphical user interface associated with a customer portal that facilitates customer registration for one or more appointment slots in accordance with the particular configuration applied to the corresponding service location. That is, based on the period of time the customer is seeking to schedule an appointment at a particular service location, the system may apply a corresponding configuration that modifies the available appointment slots displayed to the customer via a customer portal.

As described herein, the service configuration application and/or customer portal may be implemented using the above-described client-instance based architectures. But as also noted above, the service configuration application and/or customer portal may be implemented in other networked environments or on stand-alone computers as well. With the foregoing in mind, FIGS. 5-11 illustrate an exemplary graphical user interface 400 of the service configuration application 402. As described above, an administrator associated with a service provider may customize one or more configurations that may be applied by a system to provide appointment slots to potential customers at one or more service locations via the graphical user interface 400 of the service configuration application 402. As illustrated in FIGS. 5-11, the administrator may use the service configuration application 402 to customize one or more configurations for providing vaccination appointment slots for customers to book at a particular service location. Although FIGS. 5-11 are described with respect to customizing configurations of a system for providing vaccination appointment slots, it should be understood that, in other embodiments, the service configuration application may be used by the administrator to customize configurations for providing any other suitable type of appointment.

Figure 5:
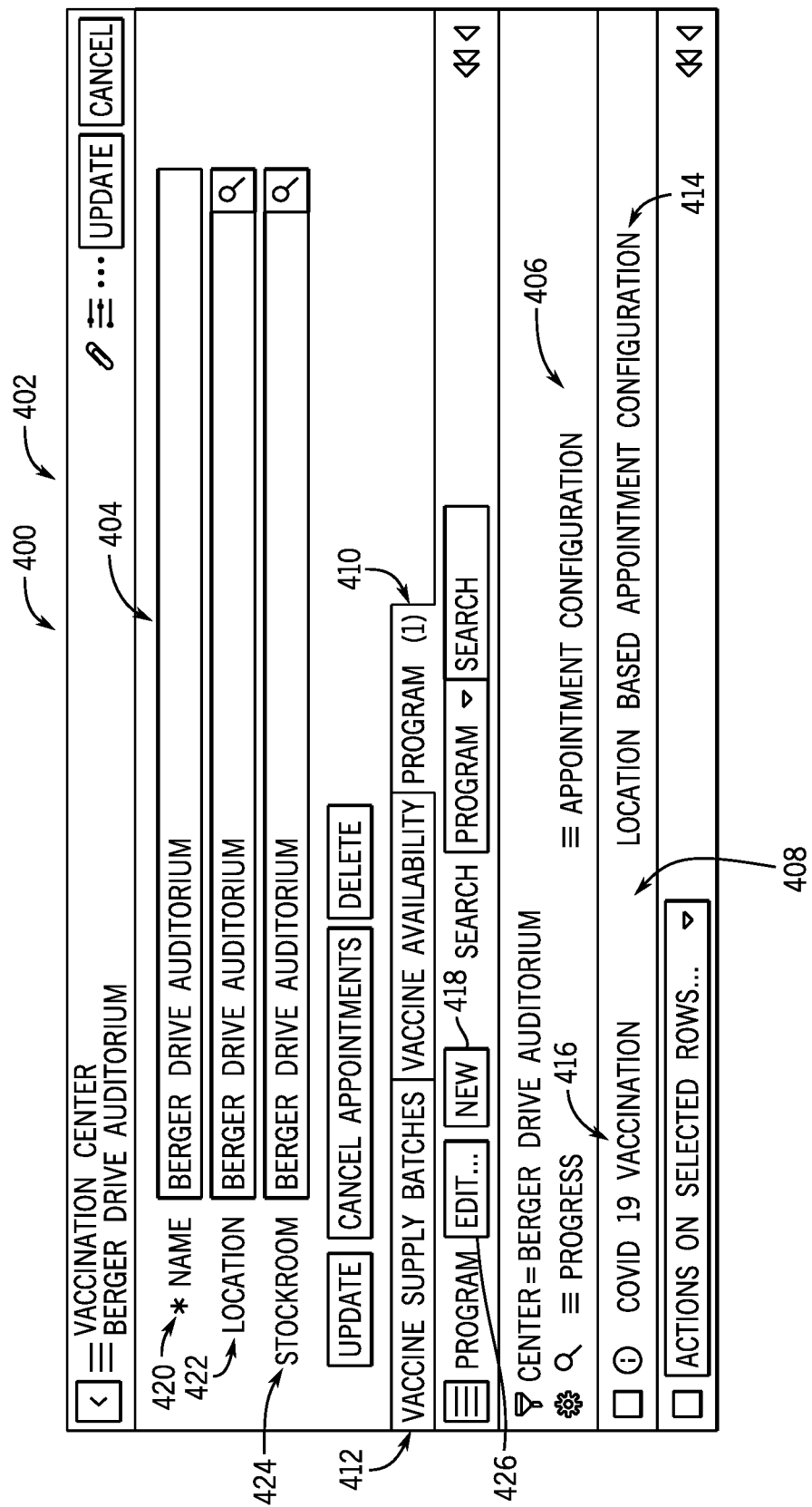
FIG. 5 illustrates an exemplary graphical user interface (GUI) associated with a service configuration application for customizing various attributes associated with a program for providing appointment slots to potential customers to receive a service at one or more centers, in accordance with aspects of the present disclosure.

Referring now to FIG. 5, the graphical user interface 400 of the service configuration application 402 may include an upper portion 404 of the graphical user interface 400 and a lower portion 406 of the graphical user interface 400. Although FIGS. 5-11 are described herein with respect to components of the graphical user interface 400 displayed in the upper portion 404 and the lower portion 406, it should be understood that, in other embodiments, the components of the graphical user interface 400 may be displayed in any suitable portion of the graphical user interface 400. As illustrated in FIG. 5, an administrator may access a list 408 of existing programs for providing appointment slots to potential customers via the lower portion 406 of the graphical user interface 400. For example, the administrator may select a "Program" tab 410 in a header 412 of the lower portion 406 of the graphical user interface 400 to display the list 408 of existing appointment configurations 414 for corresponding programs 416 created by the administrator.

Additionally, the administrator may create a new program by selecting the "New" graphical icon 418 in the lower portion 406 of the graphical user interface 400. After the administrator selects the "New" graphical icon 418 in the lower portion 406, the graphical user interface 400 may display fields 420, 422, 424 for creating the program in the upper portion 404 of the graphical user interface 400. For instance, the upper portion 404 may include a first field 420 for submitting a name associated with the program, a second field 422 for submitting a location associated with the program, and a third field 424 for submitting a stockroom associated with the program. Although the upper portion 404 of the graphical user interface 400 includes the fields 420, 422, 424 for defining attributes of the program, it should be understood that the fields 420, 422, 424 may include any suitable number of fields and types of fields for defining the attributes of the program. After the administrator has submitted information into one or more of the fields 420, 422, 424, the administrator may create the program via the graphical user interface 400 (e.g., via selection of a submit or an update graphical icon), and the lower portion 406 of the graphical user interface 400 may update to list the program in the list 408 of programs 416.

Further, the administrator may edit an existing program by selecting the "Edit" graphical icon 426 or selecting a particular program 416 in the list 408 for the programs 416. For example, after selecting a program 416 in the list 408, the upper portion 404 of the graphical user interface 400 may display the fields 420, 422, 424 described above with respect to defining attributes of the program 416. After the administrator has finished editing one or more of the fields 420, 422, 424 in the upper portion 404 of the graphical user interface 400 (e.g., by submitting respective entries in one or more of the fields 420, 422, 424), the lower portion 406 of the graphical user interface 400 may update to reflect the edited information in the fields 420, 422, 424 for the particular program 416 in the list 408.

Figure 6:
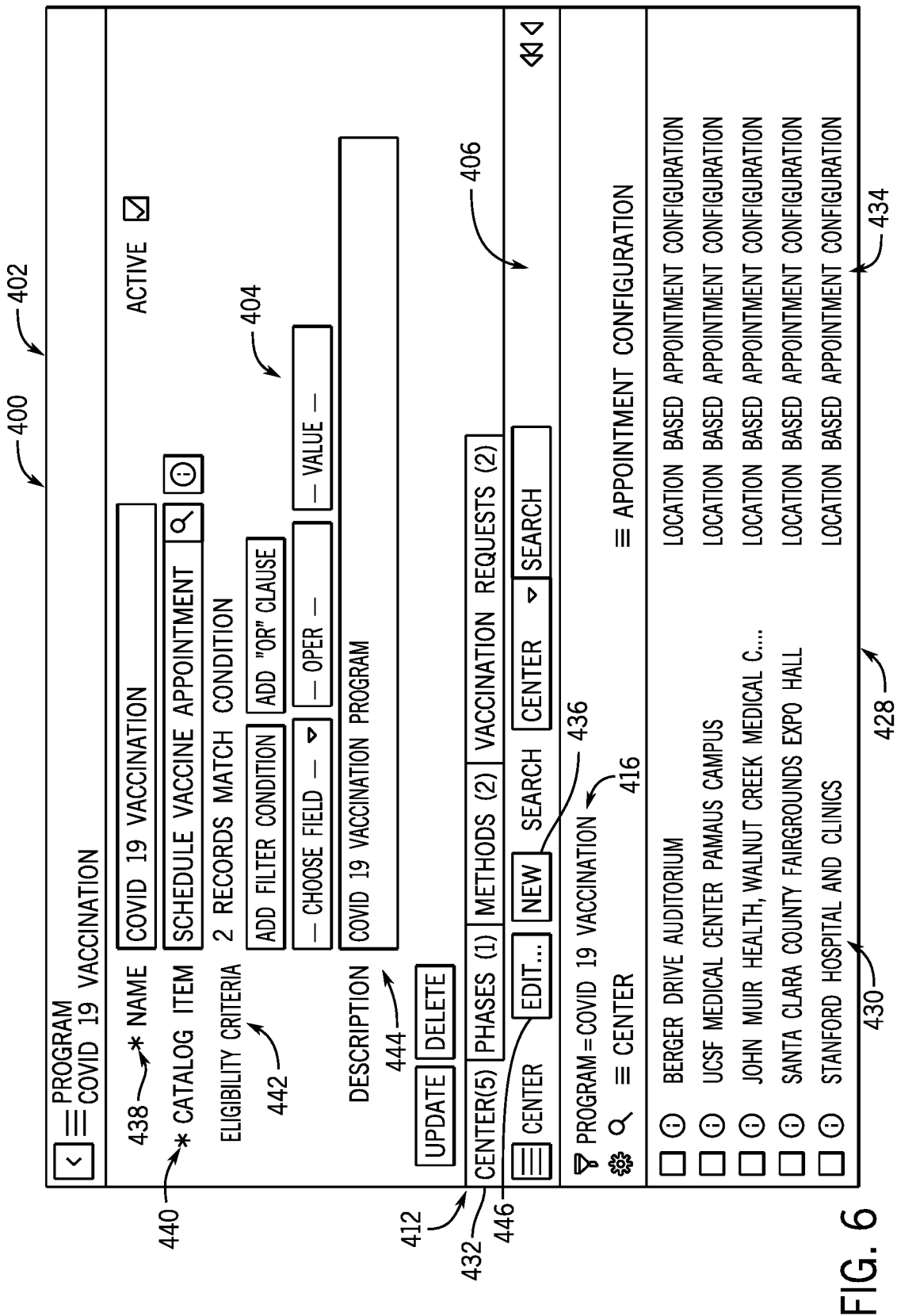
FIG. 6 illustrates the exemplary GUI of FIG. 5 for customizing various attributes associated with a particular center at which potential customers may receive the service, in accordance with aspects of the present disclosure.

After creating one or more programs 416, the administrator may select a particular program 416 in the list 408 to create or edit respective centers (e.g., service locations) associated with the program 416. As illustrated in FIG. 6, the administrator may access a list 428 of existing centers 430 associated with the program 416 for providing potential customers with vaccinations via the lower portion 406 of the graphical user interface 400. For example, the administrator may select a "Center" tab 432 in the header 412 of the lower portion 406 of the graphical user interface 400 to display the list 428 of existing appointment configurations 434 for corresponding centers 430 created by the administrator that are associated with the program 416.

As described similarly with respect to FIG. 5 above, the administrator may create a new center associated with the program 416 by selecting the "New" graphical icon 436 in the lower portion of the graphical user interface 400. After the administrator selects the "New" graphical icon 436 in the lower portion 406, the graphical user interface 400 may display fields 438, 440, 442, 444 for creating the center in the upper portion 404 of the graphical user interface 400. For instance, the upper portion 404 may include a first field 438 for submitting a name associated with the center and a second field 440 for submitting one or more catalog items (e.g., types of services) offered at the center. The upper portion 404 may also include a third field 442 (or set of fields) for defining eligibility criteria associated with the center and a fourth field 444 for submitting a description associated with the center. Although the upper portion 404 of the graphical user interface 400 includes the fields 438, 440, 442, 444 for defining various attributes of the center, it should be understood that the fields 438, 440, 442, 444 may include any suitable number of fields and types of fields for defining the attributes of the program. After the administrator has submitted information into one or more of the fields 438, 440, 442, 444, the administrator may create the center via the graphical user interface 400 (e.g., via selection of a submit or an update graphical icon), and the lower portion 406 of the graphical user interface 400 may update to list the center in the list 428 of programs 430.

Additionally, the administrator may edit an existing center by selecting the "Edit" graphical icon 446 or selecting a particular center 430 in the list 428 of existing centers 430. For example, after selecting a center 430 in the list 428, the upper portion 404 of the graphical user interface 400 may display the fields 438, 440, 442, 444 described above with respect to defining attributes of the center 430. After the administrator has finished editing one or more of the fields 438, 440, 442, 444 in the upper portion 404 of the graphical user interface 400 (e.g., by submitting respective entries in one or more of the fields 438, 440, 442, 444), the lower portion 406 of the graphical user interface 400 may update to reflect the edited information in the fields 438, 440, 442, 444 for the particular center 430 in the list 408.

Figure 7:
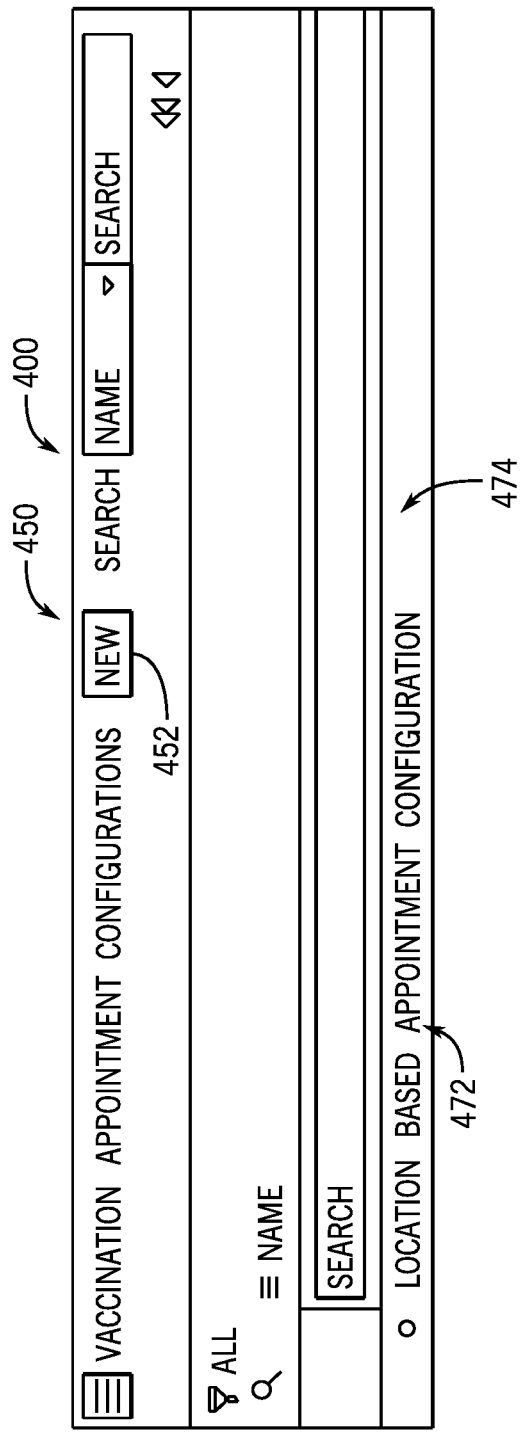
FIG. 7 illustrates a portion of the exemplary GUI of FIG. 5 for viewing existing configurations associated with a particular program and/or a particular center and initiating a customization of a new configuration associated with the particular program or the particular center, in accordance with aspects of the present disclosure.

After creating one or more centers 430, the administrator may select a respective configuration associated with a particular program 416 in the list 408 or a particular center 430 in the list 428 to create or edit for providing appointment slots to potential customers associated with the program 416 or the center 430. For instance, after selecting a particular configuration 414 in FIG. 5 or a particular configuration 434 in FIG. 6, the graphical user interface 400 of the service configuration application 402 may display the portion 450 of the graphical user interface 400 in FIG. 7. As illustrated in FIG. 7, the administrator may generate a new configuration or edge an existing configuration for providing appointment slots to potential customers for a particular program 416 or a particular center 430. In some embodiments, the portion 450 of the graphical user interface 400 may be displayed in the upper portion 404 of the graphical user interface 400. In other embodiments, the portion 450 of the graphical user interface 400 may be displayed in the lower portion 406 of the graphical user interface 400.

In any case, the administrator may create a new configuration for providing appointment slots to potential customers for a particular program 416 or a particular center 430 by selecting the "New" graphical icon 452 in the portion 450 of the graphical user interface 400. After the administrator selects the "New" graphical icon 452 in the portion 450 of the graphical user interface 400, the graphical user interface 400 may display a window 454 of FIG. 8 for defining one or more attributes of the new configuration. For instance, the window 454 may be displayed in the upper portion 404 of the graphical user interface 400, the lower portion 406 of the graphical user interface 400, or an overlay over at least a portion of the graphical user interface 400. As illustrated in FIG. 8, the window 454 may include fields 456, 458, 460, 462, 464, 466, 468, 470 for defining various attributes of the new configuration. For instance, the window 454 may include a first field 456 for submitting a name associated with the new configuration, a second field 458 for submitting a description associated with the new configuration, and a third field 460 for defining a particular holiday schedule associated with the new configuration. In particular, the holiday schedule may designate one or more blackout dates during a calendar year or multiple calendar years that the program 416 or the center 430 associated with the new configuration will not offer appointment slots for potential customers to book. In some embodiments, the third field 460 may facilitate user-selection of particular dates to blackout for the new configuration associated with the program 416 or the center 430. In other embodiments, the third field 460 may facilitate user-selection of a pre-defined set of dates that correspond to a country, a company, or the like.

The window 454 may also include a fourth field 462 for defining a duration associated with each appointment slot that a potential customer may book. In some embodiments, the fourth field 462 may provide a drop-down list of a list of various durations that the administrator may select to define the duration for each appointment of the new configuration. In other embodiments, the fourth field 462 may facilitate submission of a numerical value by the administrator to define the duration for each appointment of the new configuration. Additionally, or alternatively, the fourth field 462 may facilitate defining more than one duration associated with correspond sets of appointment slots. Further, the window 454 may include a fifth field 464 for designating a lead time associated with the new configuration. For instance, the lead time may define a minimum number of hours before an appointment slot may be available on a particular day defined via the fourth field 462. The window 454 may also include a sixth field 466 for designating a maximum time period associated with the new configuration, a seventh field 468 for designating a time limit for rescheduling or canceling an appointment booked by a customer before the scheduled appointment, and an eighth field 470 for activating or deactivating the new configuration after the new configuration has been created. Although the window 454 of the graphical user interface 400 includes the fields 456, 458, 460, 462, 464, 466, 468, 470 for defining various attributes of the new configuration, it should be understood that the fields 456, 458, 460, 462, 464, 466, 468, 470 may include any suitable number of fields and types of fields for defining the attributes of the new configuration.

Additionally, or alternatively, the administrator may edit an existing configuration for providing appointment slots to potential customers for a particular program 416 or a particular center 430 by selecting a corresponding configuration 472 in a list 474 of existing configurations in the portion 450 of the graphical user interface 400 (i.e., in FIG. 7). For example, after selecting a configuration 472 in the list 474, the graphical user interface 400 may display the window 454 for defining one or more attributes of the existing configuration 472 (i.e., in FIG. 8) as described above. After the administrator has finished editing one or more of the fields 456, 458, 460, 462, 464, 466, 468, 470 in the window 454 of the graphical user interface 400, the portion 450 of the graphical user interface 400 may update to reflect the edited information in the fields 456, 458, 460, 462, 464, 466, 468, 470 for the particular configuration 472 in the list 474.

After creating one or more configurations 472 associated with a program or a center, the administrator may create or edit respective schedules associated with the configurations 472. For instance, after selecting a particular configuration 472 in the list 474 illustrated in FIG. 9, the graphical user interface 400 of the service configuration application 402 may display a list 476 of existing schedules 478 for the particular configuration 472 in the lower portion 406 of the graphical user interface 400. In some embodiments, the upper portion 404 of the graphical user interface 400 may display the fields 456, 458, 460, 462, 464, 466, 468, 470 for editing the particular configuration 472 by default. In other embodiments, the upper portion 404 of the graphical user interface may be blank or include other information related to the particular configuration 472.

Figure 9:
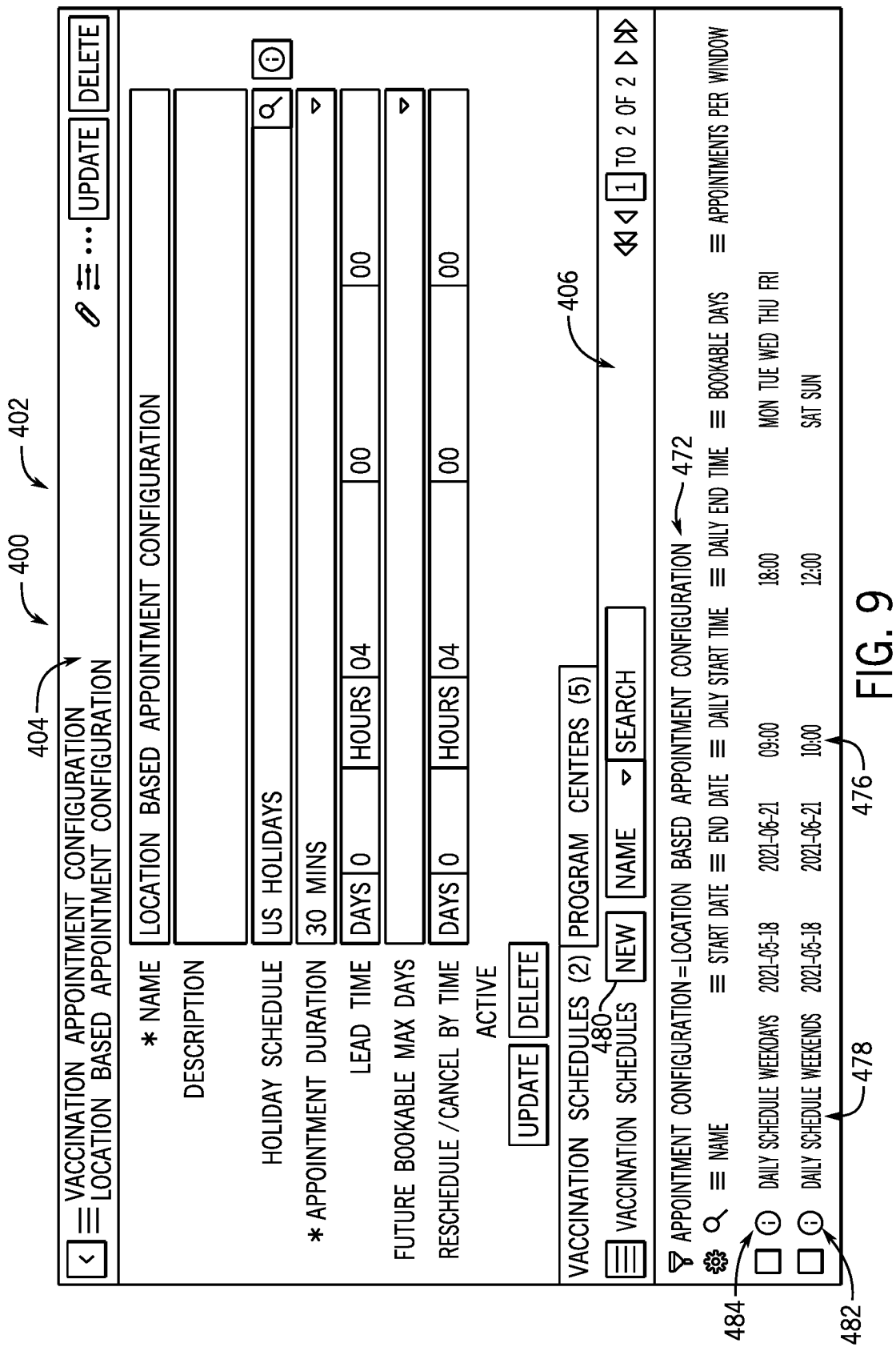
FIG. 9 illustrates the exemplary GUI of FIG. 5 for customizing various attributes of a schedule associated with a particular configuration, in accordance with aspects of the present disclosure.
Figure 10:
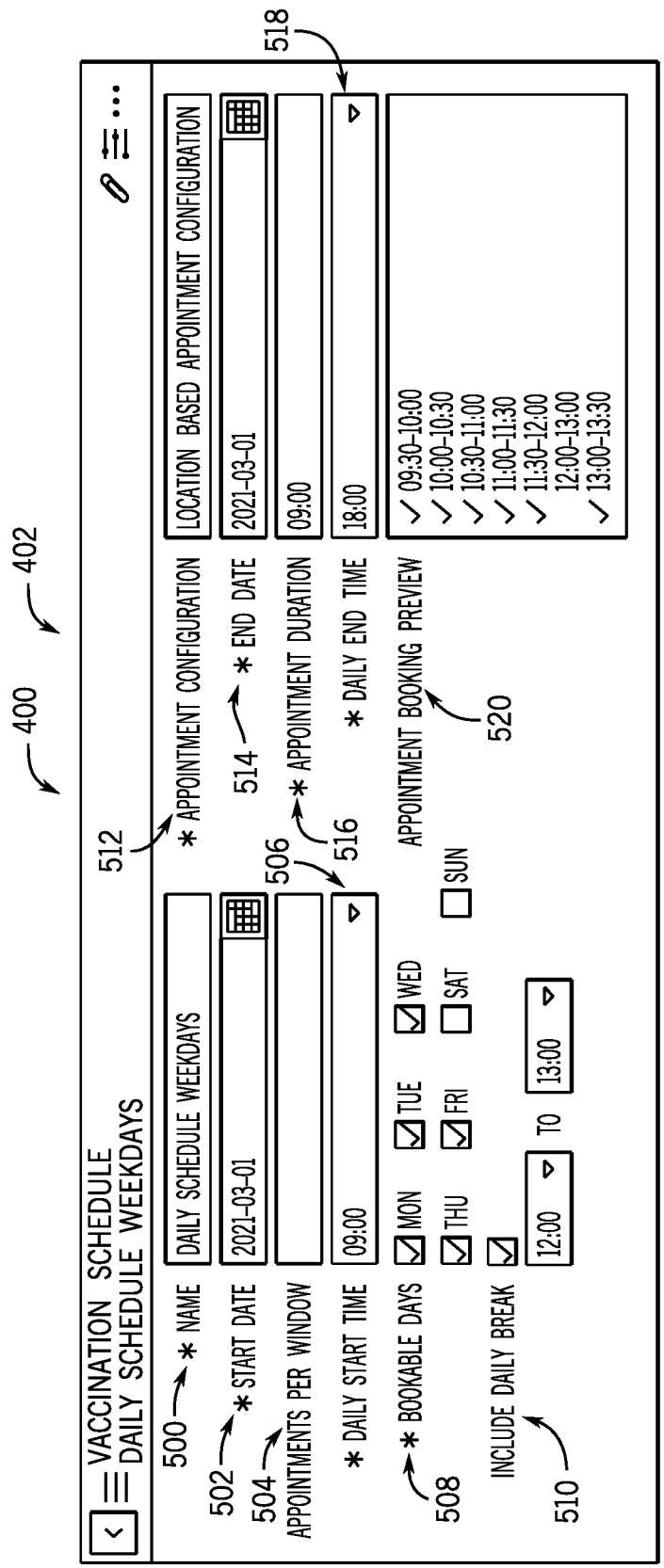
FIG. 10 illustrates a portion of the exemplary GUI of FIG. 5 for customizing various attributes of the schedule associated with the particular configuration, in accordance with aspects of the present disclosure.

As illustrated in FIG. 9, the administrator may create a new schedule for the configuration 472 by selecting the "New" graphical icon 480 in the lower portion 406 of the graphical user interface 400. After the administrator selects the "New" graphical icon 480 in the lower portion 406, the graphical user interface 400 may display fields 500, 502, 504, 508, 510, 512, 516, 518, 520 for creating the new schedule in the upper portion 404 of the graphical user interface 400 (i.e., as illustrated in FIG. 10). As illustrated in FIG. 10, the upper portion 404 may include a first field 500 for defining a name of the new schedule, a second field 502 for defining a start date of the new schedule, a third field 504 for defining a number of appointment slots that may be available to be booked by potential customers during the same time window, a fourth field 506 for defining a start time of providing appointment slots to potential customers for one or more days of the new schedule, a fifth field 508 for defining a set of days per week that the new schedule may be applied to, and a sixth field 510 for defining a break period for one or more days of the new schedule in which no appointment slots may be provided to potential customers. The upper portion 406 of the graphical user interface 400 may also include a seventh field 512 for defining which configurations the new schedule will be applied to after creating the new schedule, an eighth field 514 for defining an end date of the new schedule, a ninth field 516 for defining a duration of time for each appointment slot provided to the potential customers, and a tenth field 518 for defining an end time of providing appointment slots to potential customers for one or more days of the new schedule. Further, the upper portion 404 of the graphical user interface 400 may include a schedule preview 520 (e.g., an eleventh field) that displays a previous of the available appointment slots available to a user in accordance with the new schedule. For example, after the administrator completes one or more fields 500, 502, 504, 508, 510, 512, 516, 518, the graphical user interface 400 may update to display a preview of the new schedule in the schedule preview window 520 based on the completed fields 500, 502, 504, 508, 510, 512, 516, 518. Although the upper portion 404 of the graphical user interface 400 includes the fields 500, 502, 504, 508, 510, 512, 516, 518, 520 for defining attributes of the new schedule, it should be understood that the fields 500, 502, 504, 508, 510, 512, 516, 518, 520 may include any suitable number of fields and types of fields for defining the attributes of the new schedule.

Further, the administrator may edit an existing schedule by selecting a particular schedule 478 in the list 476 (e.g., in FIG. 9). For example, after selecting a program 478 in the list 476, the upper portion 404 of the graphical user interface 400 may display the fields 500, 502, 504, 508, 510, 512, 516, 518, 520 described above with respect to defining attributes of the schedule 478. After the administrator has finished editing one or more of the fields 500, 502, 504, 508, 510, 512, 516, 518 in the upper portion 404 of the graphical user interface 400, the lower portion 406 of the graphical user interface 400 may update to reflect the edited information in the fields 500, 502, 504, 508, 510, 512, 516, 518 for the particular schedule 478 in the list 476.

As illustrated in FIG. 9, the administrator may create different schedules (e.g., 482, 484) for applying a particular configuration 472 to a particular program 416 or a particular center 430. For instance, a first schedule (e.g., 482) may apply to the particular configuration 472 to define available appointment slots to be booked by potential customers during a first time period, and the second schedule (e.g., 484) may apply to the particular configuration 472 to define available appointment slots to be booked by potential customers during a second time period different from the first time period. In some embodiments, the administrator may create more than two different schedules for the particular configuration 472. In this way, the service configuration application 402 may provide an administrator with various tools to customize each configuration 472 for providing appointment slots to potential customers for a particular program 416 or a particular center 430 with a high degree of granularity.

Figure 11:
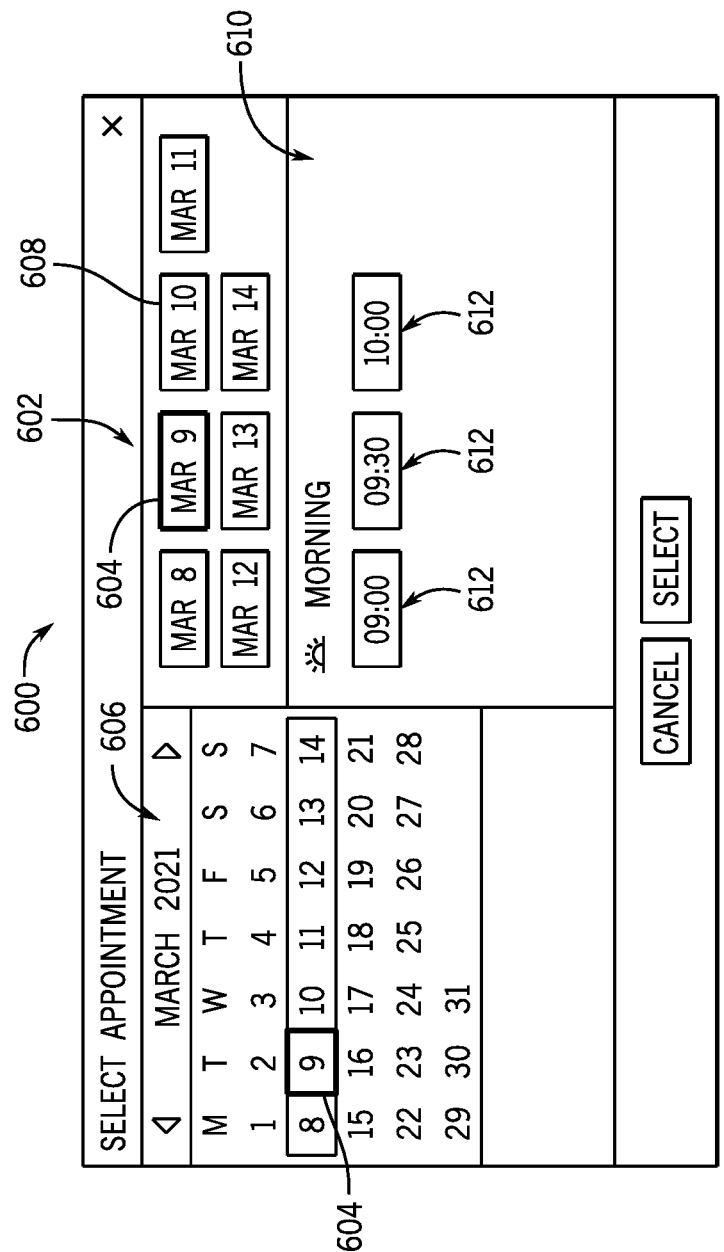
FIG. 11 illustrates an exemplary GUI associated with a customer portal for scheduling an appointment based on a list of available appointment slots in accordance with a first configuration associated with a center and/or a program, in accordance with aspects of the present disclosure.
Figure 12:
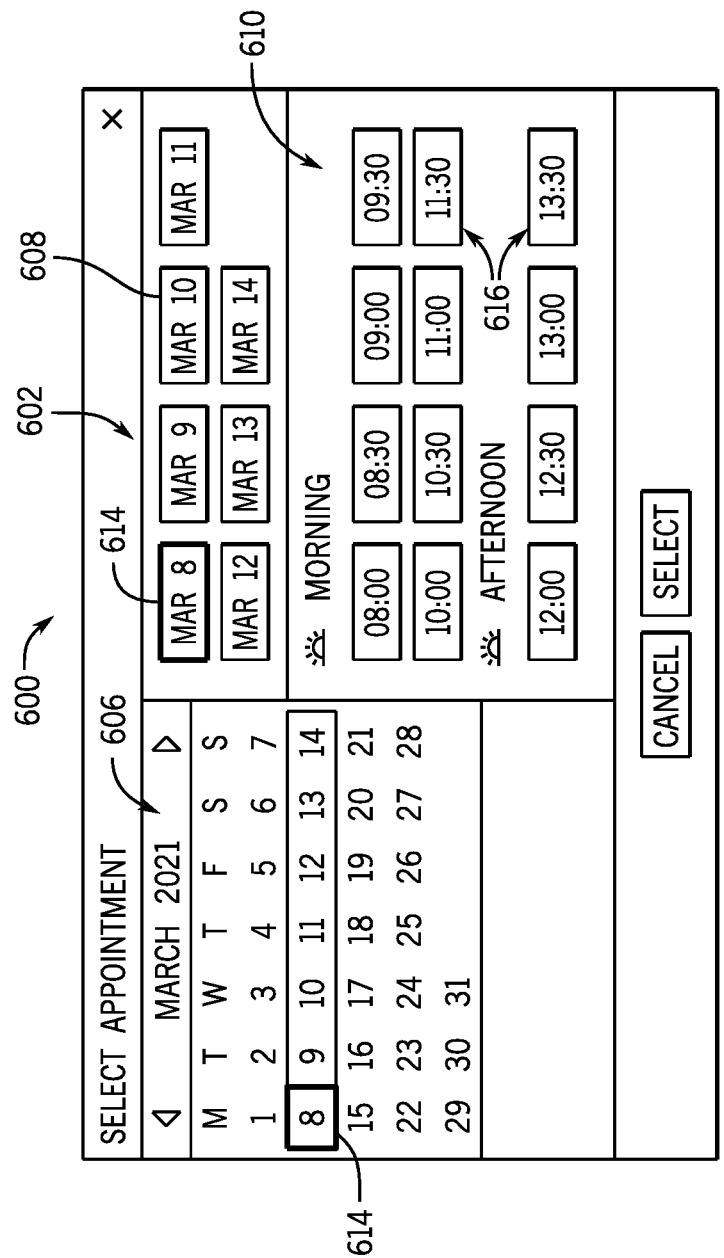
FIG. 12 illustrates the exemplary GUI of FIG. 11 associated with the customer portal for scheduling an appointment based on a different list of available appointment slots in accordance with a second configuration associated with the center and/or the program, in accordance with aspects of the present disclosure.

After the administrator has generated and/or customized one or more configurations 472 for providing appointment slots to potential customers for a particular program 416 or a particular center 430, the cloud-based platform 16 may apply the configurations 472 to a customer portal that facilitates customer registration for one or more appointment slots. FIGS. 11 and 12 illustrate a graphical user interface 600 of the customer portal 602 that may be displayed to potential customers via one or more client instances 102. For instance, as illustrated in FIG. 11, a customer may select a first date 604 in the graphical user interface 600 of the customer portal 602. In certain embodiments, the customer may select the first date 604 via a calendar window 606 in the graphical user interface 600. In other embodiments, the customer may select the first date 605 via a list window 608 in the graphical user interface 600. In any case, after the customer selects the first date 604 in the graphical user interface 600, the graphical user interface 600 may display the list 610 of available appointment slots 612 that may be booked by the customer for receiving a particular service from the service provider. For example, as described above, the service may be provided to the customer at a particular center (e.g., service location) by the service provider. The list 610 of available appointment slots 612 may be displayed by the customer portal in accordance with one or more attributes associated with a corresponding configuration (e.g., 472) associated with the center or a program associated with the center.

As described above, an administrator associated with the service provider may customize more than one configuration (e.g., 482, 484) associated with the center or the program associated with the center. The customer portal 602 may display the list 610 of available appointment slots 612 based on the particular configuration 482, 484 that is configured to apply to the center or the program associated with the center on the particular date 604 selected by the customer. As illustrated in FIG. 12, the graphical user interface 600 of the customer portal 602 may display the list 610 of available appointment slots 616 in response to the customer selecting a second date 614 in the graphical user interface 600 (e.g., via the calendar window 606 or the list window 608). In this way, the customer portal 602 may display available appointment slots to the customer based on different configurations (e.g., 472) defined by the administrator via the service configuration application 402.

As mentioned above, after one or more customers have scheduled appointments for receiving a service in one or more respective appointment slots, an event may occur that affects the availability of resources for providing the service or the timing for providing the service. For instance, such events may include an increase or a decrease in a number of personnel available to provide the service to the customers, an increase or decrease in the time for providing the service in a particular time period, an increase or a decrease in the duration of the appointment slots for providing the service, a change in the start time or the end time of the appointment slots for providing the service, an increase or a decrease in the number of appointment slots available during a particular time period, or the like. In certain embodiments, an administrator may edit one or more configurations (e.g., 472) to adjust one or more attributes of the configurations 472 to accommodate the occurrence of the events (e.g., via the service configuration application 402). For instance, the administrator may edit a start date associated with a particular configuration 472, an end date associated with a particular configuration 472, a number of appointments per time window associated with a particular configuration 472, an appointment duration associated with a particular configuration 472, a daily start time associated with a particular configuration 472, a daily end time associated with a particular configuration 472, a particular set of days that the service is offered, a daily break associated with a particular configuration 472, or the like. In other embodiments, the cloud-based platform 16 may automatically modify one or more attributes of a particular configuration 472 in response to receiving an indication of an occurrence of one or more events. In any case, after one or more attributes of a particular configuration 472 are modified after the occurrence of one or more events, the customer portal 602 may display an updated list 610 of available appointment slots (e.g., 612, 616) that may be booked by a potential customer in accordance with the modified configuration.

However, in certain embodiments, the service provider may want to avoid mass rescheduling of existing appointments booked by customers. For instance, the cloud-based platform 16 may maintain existing appointments booked by customers before the attributes of a particular configuration 472 are modified or before the cloud-based platform 16 received the indication of the occurrence of the events described above. The cloud-based platform 16 may maintain any appointments booked by customers and automatically adjust the availability of new appointments that may be booked by potential customers based on the modified configurations 472 and/or the events.

In particular, the cloud-based platform 16 may determine the availability of the new appointments that may be booked by potential customers by applying an algorithm that prevents overbooking and underbooking of new appointments during each time window provided by the modified configurations 472. In some embodiments, the cloud-based platform 16 may provide a list of the available appointments on a particular day to a potential customer via the customer portal 602 described above. In other embodiments, the cloud-based platform 16 may automatically determine the next appointment slot that may be available to the customer based on a customer request. For example, the customer request may include a center (e.g., a service location) for the service, a particular day or a particular time period for receiving the service, or the like. After determining the next appointment slot available to the customer, the cloud-based platform 16 may provide an indication of the determined appointment slot to the customer via the customer portal 602, automatically schedule the determined appointment slot for the customer, or both.

As mentioned above, the cloud-based platform 16 may apply the algorithm to determine an availability of new appointments for a service at a center that may be booked by potential customers based on a modified configuration associated with the center or a program associated with the center. In particular, the cloud-based platform 16 may apply the algorithm to determine whether a particular appointment for a customer may be scheduled with existing appointments (e.g., conflicting appointments and/or overlapping appointments) at the center without overbooking one or more time windows for providing the service at the center. For instance, given an existing schedule of appointments booked by customers at the center, the cloud-based platform 16 may determine the number of appointments that are scheduled within the time windows at a particular center. For example, for a given time window at the particular center, the time window may have a duration, a start time, and an end time. The time window, the start time, and the end time may be equivalent to one or more attributes of the modified configuration 472 defined by an administrator via the service configuration application 402 described above. In some embodiments, the cloud-based platform 16 may determine the number of scheduled appointments within each time window at the particular center sequentially. In other embodiments, the cloud-based platform 16 may determine the number of scheduled appointments simultaneously or substantially simultaneously. In certain embodiments, the time windows may correspond to potential appointment slots that a potential customer may book for receiving a service at the center (e.g., based on a customer request).

In any case, the cloud-based platform 16 may determine the number of scheduled appointments within a particular time window (e.g., conflicting appointments) by first (1) identifying a first number of scheduled appointments that have respective start times before or equal to the start time of the particular time window and respective end times equal to or after the end time of the particular time window; (2) identifying a second number of scheduled appointments that have respective end times after the start time of the particular time window and respective end times before or equal to the end time of the particular time window; and (3) identifying a third number of scheduled appointments that have respective start times equal to or after the start time of the particular time window and respective start times before the end time of the particular time window. The cloud-based platform 16 may then determine the number of scheduled appointments within the particular time window by determining a sum of the maximum number between the second number of scheduled appointments and the third number of schedule appointments, and the first number of scheduled appointments. In this way, the cloud-based platform 16 may account for scheduled appointments that directly overlap with the particular time window or partially overlap with the particular time window when determining the number of scheduled appointments that exist within the particular time window (e.g., conflicting appointments).

The cloud-based platform 16 may then compare the number of appointments that are scheduled within the particular time window to a capacity of the center within the particular time window. For instance, the capacity of the center may be equivalent to a maximum number of appointments that the center may provide to potential customers during the particular time window simultaneously. In some embodiments, the capacity of the center may be based on a number of service personnel associated with the service provider at the center that are able to provide the service to potential customers, a quantity of resources associated with the center, or the like. If the cloud-based platform 16 determines that the number of scheduled appointments within the particular time window is less than the capacity of the center, the cloud-based platform 16 may determine that a new appointment may be booked within the particular time window at the center by a potential customer.

In some embodiments, the cloud-based platform 16 may perform the above-described process for each time window of each appointment slot that may be offered by the service provider to potential customers at the center based on the modified configuration 472. As mentioned above, for example, the cloud-based platform 16 may determine the number of scheduled appointments within each time window of each appointment slot at the particular center sequentially, simultaneously, or substantially simultaneously. The cloud-based platform 16 may then compare the number of scheduled appointments within each time window of each appointment slot at the particular center to the capacity of the center and determine that a new appointment may be booked within each time window if the number of scheduled appointments within each time window is less than the capacity of the particular center during the time window.

In certain embodiments, after determining that a new appointment may be booked within one or more time windows of one or more appointments slots that may be provided by the modified configuration, the cloud-based platform 16 may automatically schedule the new appointment within a particular time window that can accommodate the new appointment. In other embodiments, the cloud-based platform 16 transmits an update to the graphical user interface 600 of the customer portal 602 to provide an updated listing of available appointment slots that potential customers may book to receive the service at the center. Additionally, or alternatively, in response to receiving a customer request to book a particular appointment slot, the cloud-based platform 16 may compare the time window associated with the customer request to book the particular appointment slot to the particular time windows that may accommodate new appointments. If the time window associated with the customer request matches the time windows that may accommodate new appointments, the cloud-based platform 16 may allow the scheduling of the requested appointment slot to occur. However, if the time window associated with the customer request does not match the time windows that may accommodate new appointments, the cloud-based platform 16 may prevent the scheduling of the requested appointment slot. In this way, the cloud-based platform 16 may prevent the overbooking of any time windows for providing appointments at a particular center in real-time as modifications are made to one or more configurations associated with the center or a program associated with the center due to the occurrence of one or more events.

Figure 13:
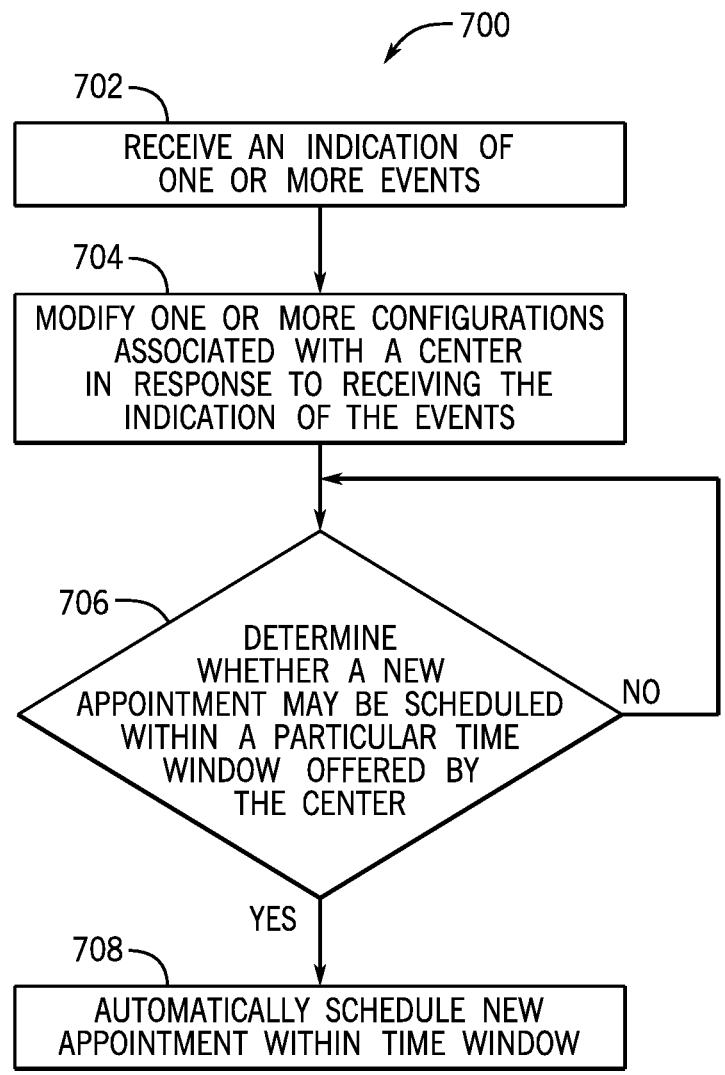
FIG. 13 is a flow chart of a process for determining whether a new appointment may be automatically scheduled within a particular time window of an appointment slot offered by a center after one or more modifications to one or more configurations associated with the center, in accordance with aspects of the present disclosure.

With the foregoing in mind, FIG. 13 illustrates a flow chart of a process 700 that may be performed by the cloud-based platform 16 for determining whether a new appointment may be automatically scheduled within a particular time window of an appointment slot offered by a center after one or more modifications to one or more configurations associated with the center due to the occurrence of one or more events. At block 702, the cloud-based platform 16 may receive an indication of one or more events that affect the availability of resources for providing a service at a particular center. As mentioned above, the events may include an increase or a decrease in a number of personnel available to provide the service to the customers, an increase or decrease in the time for providing the service in a particular time period, an increase or a decrease in the duration of the appointment slots for providing the service, a change in the start time or the end time of the appointment slots for providing the service, an increase or a decrease in the number of appointment slots available during a particular time period, or the like.

After receiving the indication of the events at block 702, the cloud-based platform 16 may modify one or more configurations associated with the center. In some embodiments, an administrator may edit the configurations to adjust one or more attributes of the configurations to accommodate the occurrence of the events (e.g., via a service configuration application). In other embodiments, the cloud-based platform 16 may automatically modify the configurations associated with the center. After one or more configurations associated with the center have been modified at block 704, the cloud-based platform 16 may determine whether a new appointment may be scheduled within a particular time window offered by the center in accordance with the modified configurations associated with the center at block 706. As mentioned above, the cloud-based platform 16 may apply an algorithm that prevents overbooking and underbooking of new appointments during the particular time window offered by the center. That is, given an existing schedule of appointments booked by customer at the center, the cloud-based platform 16 may determine the number of scheduled appointment within the particular time window offered by the center by implementing the algorithm. In particular, the cloud-based platform 16 may (1) identify a first number of scheduled appointments that have respective start times before or equal to the start time of the particular time window and respective end times equal to or after the end time of the particular time window; (2) identify a second number of scheduled appointments that have respective end times after the start time of the particular time window and respective end times before or equal to the end time of the particular time window; and (3) identify a third number of scheduled appointments that have respective start times equal to or after the start time of the particular time window and respective start times before the end time of the particular time window. The cloud-based platform 16 may then determine the number of scheduled appointments within the particular time window by determining a sum of the maximum number between the second number of scheduled appointments and the third number of scheduled appointments, and the first number of scheduled appointments.

The cloud-based platform 16 may then compare the number of appointments that are scheduled within the particular time window to a capacity of the center within the particular time window. If the cloud-based platform 16 determines that the number of scheduled appointments within the particular time window is less than the capacity of the center during the particular time window, the cloud-based platform 16 may determine that a new appointment may be booked within the particular time window at the center. After determining that a new appointment may be booked within the particular time window offered by the center at block 706, the cloud-based platform 16 may automatically schedule the new appointment within the particular time window at block 708. However, if the cloud-based platform 16 determines that the new appointment may not be booked within the particular time window at the center, the cloud-based platform 16 may repeat the determination at block 706 until another time window is identified that may accommodate scheduling of the new appointment at the center in accordance with the modified configurations associated with the center. After the cloud-based platform 16 identifies another time window that may accommodate the scheduling of the new appointment at the center, the cloud-based platform 16 may automatically schedule the new appointment within the identified time window at block 708.

Figure 14:
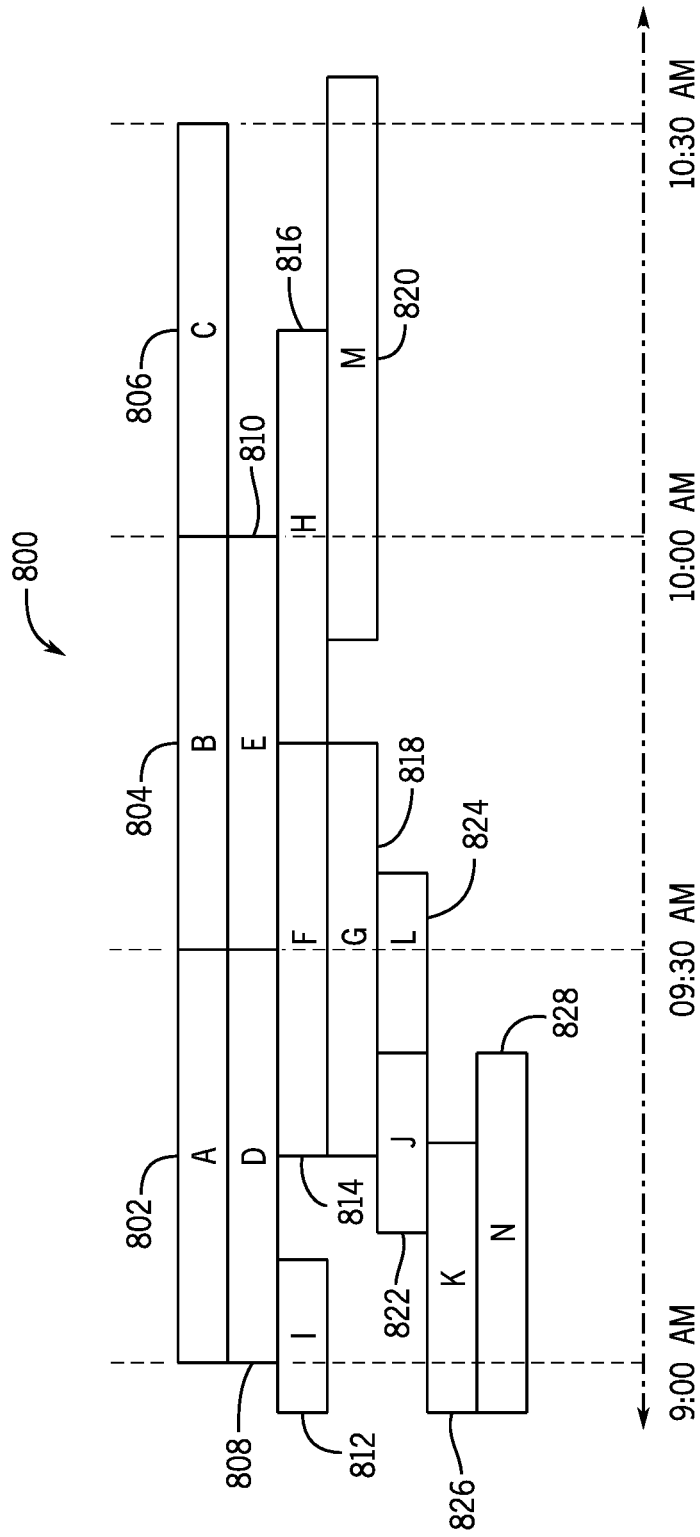
FIG. 14 is an exemplary schedule of various appointments that may be scheduled and/or maintained after the occurrence of one or more events based on one or more configurations associated with the center, in accordance with aspects of the present disclosure.

As mentioned above, after one or more configurations associated with the center have been modified at block 704, the cloud-based platform 16 may determine whether a new appointment may be scheduled within a particular time window offered by the center in accordance with the modified configurations associated with the center at block 706. In particular, the cloud-based platform 16 may apply the algorithm described herein to prevent overbooking and/or underbooking of new appointments during a particular time window offered by the center. That is, given an existing schedule of appointments booked by customers at the center, the cloud-based platform 16 may determine whether a new appointment may be schedule during a particular time period based on whether the number of scheduled appointments within the particular time window is less than a capacity of the center. With the foregoing in mind, FIG. 14 illustrates an exemplary schedule 800 of appointments that may be booked before and after the occurrence of one or more events that prompted a change to one or more attributes of one or more configurations associated with the center for scheduling the appointments. For instance, appointments 802, 804, 806, 808, 810 have been scheduled according to a particular configuration associated with the center before the occurrence of the events. As illustrated in FIG. 14, appointments 802 and 808 have a start time of 9:00 a.m., an end time of 9:30 a.m., and a duration of 30 minutes; appointments 804 and 810 have a start time of 9:30 a.m., an end time of 10:00 a.m., and a duration of 30 minutes; and appointment 806 has a start time of 10:00 a.m., an end time of 10:30 am, and a duration of 30 minutes. Although the appointments illustrated in FIG. 14 are described with particular attributes (e.g., particular start times, end times, and/or durations), it should be understood that such attributes are merely exemplary and that, in other embodiments, such attributes and/or other suitable attributes of the appointments may be used by the cloud-based platform 16 to schedule the appointments.

After the occurrence of the events, the cloud-based platform 16 may determine whether a new appointment may be scheduled within a particular time window offered by the center. For instance, the cloud-based platform 16 may have modified one or more configurations associated with the center to accommodate the occurrence of the events. Given the schedule 800 of existing appointment 802, 804, 806, 808, 810, the cloud-based platform 16 may determine whether the new appointments 812, 814, 816, 818, 820, 824, 826, 828, 830 may be scheduled in accordance with the modified configurations.

With respect to new appointment 812, the cloud-based platform 16 has modified the configuration associated with the center to change the start time of new appointments to 8:55 a.m. and the duration of new appointments to 20 minutes. To determine whether new appointment 812 may be scheduled within the time window from 8:55 a.m. to 9:15 a.m., the cloud-based platform 16 may determine the number of existing appointments (e.g., 802, 804, 806, 808, 810) that overlap or conflict within the time window and determine whether the number of existing appointments within the time window is less than the capacity of the center. As illustrated in FIG. 14, the cloud-based platform 16 may (1) identify that a first number of scheduled appointments that have respective start times before or equal to the start time of the particular time window (i.e., 8:55 a.m.) and respective end times equal to or after the end time of the particular time window (i.e., 9:15 a.m.) is equal to 0; (2) identify that a second number of scheduled appointments that have respective end times after the start time of the particular time window (i.e., 8:55 a.m.) and respective end times before or equal to the end time of the particular time window (i.e., 9:15 a.m.) is equal to 0; and (3) identify that a third number of scheduled appointments 802, 808 that have respective start times equal to or after the start time of the particular time window (i.e., 8:55 a.m.) and respective start times before the end time of the particular time window (i.e., 9:15 a.m.) is equal to 2. The cloud-based platform 16 may then determine that the number of scheduled appointments within the particular time window (i.e., 8:55 a.m. to 9:15 a.m.) is equal to 2 based on the sum of (1) the maximum number between the second number of scheduled appointments and the third number of scheduled appointments, and (2) the first number of scheduled appointments (i.e., max(0, 2)+0). The cloud-based platform 16 may then compare the number of scheduled appointments (i.e., 2) within the particular time window to the capacity of the center within the particular time window to determine whether the cloud-based platform 16 may schedule the new appointment 812 during the particular time window (i.e., 8:55 a.m. to 9:15 a.m.). For instance, if the capacity of the center is 2, the cloud-based platform 16 may determine that that the capacity of the center does not accommodate the new appointment 812 during the particular time window (i.e., 8:55 a.m. to 9:15 a.m.). However, if the capacity of the center is 3 or greater, the cloud-based platform 16 may determine that the capacity of the center accommodates the new appointment 812 and may schedule the new appointment 812 during the particular time window (i.e., 8:55 a.m. to 9:15 a.m.).

With respect to new appointment 814, the cloud-based platform 16 has modified the configuration associated with the center to change the start time of new appointments to 9:15 a.m. To determine whether new appointment 814 may be scheduled within the time window from 9:15 a.m. to 9:45 a.m., the cloud-based platform 16 may determine the number of existing appointments (e.g., 802, 804, 806, 808, 810, 812) that overlap or conflict within the time window and determine whether the number of existing appointments within the time window is less than the capacity of the center. As illustrated in FIG. 14, the cloud-based platform 16 may (1) identify that a first number of scheduled appointments that have respective start times before or equal to the start time of the particular time window (i.e., 9:15 a.m.) and respective end times equal to or after the end time of the particular time window (i.e., 9:45 a.m.) is equal to 0; (2) identify that a second number of scheduled appointments 802, 808 that have respective end times after the start time of the particular time window (i.e., 9:15 a.m.) and respective end times before or equal to the end time of the particular time window (i.e., 9:45 a.m.) is equal to 2; and (3) identify that a third number of scheduled appointments 804, 810 that have respective start times equal to or after the start time of the particular time window (i.e., 9:15 a.m.) and respective start times before the end time of the particular time window (i.e., 9:45 a.m.) is equal to 2. The cloud-based platform 16 may then determine that the number of scheduled appointments within the particular time window (i.e., 9:15 a.m. to 9:45 a.m.) is equal to 2 based on the sum of (1) the maximum number between the second number of scheduled appointments and the third number of scheduled appointments, and (2) the first number of scheduled appointments (i.e., max(2, 2)+0). The cloud-based platform 16 may then compare the number of scheduled appointments (i.e., 2) within the particular time window to the capacity of the center within the particular time window to determine whether the cloud-based platform 16 may schedule the new appointment 812 during the particular time window (i.e., 9:15 a.m. to 9:45 a.m.). For instance, if the capacity of the center is 2, the cloud-based platform 16 may determine that that the capacity of the center does not accommodate the new appointment 812 during the particular time window (i.e., 9:15 a.m. to 9:45 a.m.). However, if the capacity of the center is 3 or greater, the cloud-based platform 16 may determine that the capacity of the center accommodates the new appointment 812 and may schedule the new appointment 812 during the particular time window (i.e., 9:15 a.m. to 9:45 a.m.).

With respect to new appointment 816, the capacity of the center may be equal to three (3) appointments per time window (e.g., three service personnel available to provide the service to the customers during the time window). For instance, the cloud-based platform 16 may determine whether new appointment 816 may be scheduled within the time window from 9:15 a.m. to 9:45 a.m. as described above with respect to new appointment 814. However, since the capacity of the center is 3, the cloud-based platform 16 may determine that the capacity of the center does not accommodate new appointment 816 within the time window from 9:15 a.m. to 9:45 a.m. because the first service personnel is booked for appointment 802 and appointment 804 between 9:15 a.m. and 9:45 a.m., the second service personnel is booked for appointment 808 and appointment 810 between 9:15 a.m. and 9:45 a.m., and the third service personnel is booked for appointment 814 between 9:15 a.m. and 9:45 a.m.

The cloud-based platform 16 may then determine whether the new appointment 816 may be scheduled at the next available time slot (i.e., 9:45 a.m. to 10:15 a.m.). As illustrated in FIG. 14, the cloud-based platform 16 may (1) identify that a first number of scheduled appointments that have respective start times before or equal to the start time of the particular time window (i.e., 9:45 a.m.) and respective end times equal to or after the end time of the particular time window (i.e., 10:15 a.m.) is equal to 0; (2) identify that a second number of scheduled appointments 804, 810 that have respective end times after the start time of the particular time window (i.e., 9:45 a.m.) and respective end times before or equal to the end time of the particular time window (i.e., 10:15 a.m.) is equal to 2; and (3) identify that a third number of scheduled appointments 806 that have respective start times equal to or after the start time of the particular time window (i.e., 9:45 a.m.) and respective start times before the end time of the particular time window (i.e., 10:15 a.m.) is equal to 1. The cloud-based platform 16 may then determine that the number of scheduled appointments within the particular time window (i.e., 9:45 a.m. to 10:15 a.m.) is equal to 2 based on the sum of (1) the maximum number between the second number of scheduled appointments and the third number of scheduled appointments, and (2) the first number of scheduled appointments (i.e., max(2, 1)+0). The cloud-based platform 16 may then compare the number of scheduled appointments (i.e., 2) within the particular time window to the capacity of the center (i.e., 1) within the particular time window to determine whether the cloud-based platform 16 may schedule the new appointment 812 during the particular time window (i.e., 9:45 a.m. to 10:15 a.m.). Since the capacity of the center is equal to 3, the cloud-based platform 16 determines that the number of scheduled appointments (i.e., 2) within the time window is less than the capacity of the center and may schedule the new appointment 816 during the particular time window (i.e., 9:45 a.m. to 10:15 a.m.).

With respect to new appointment 818, the cloud-based platform 16 has modified the configuration associated with the center to change the capacity of the center to 4. Additionally, the start time of new appointments defined by the configuration associated with the center may be set to 9:15 a.m. The cloud-based platform 16 may determine whether new appointment 818 may be scheduled within the time window from 9:15 a.m. to 9:45 a.m. as described above with respect to new appointment 814 and new appointment 816. However, since the capacity of the center has been modified to 4, the cloud-based platform 16 may determine that the capacity of the center accommodates new appointment 818 within the time window from 9:15 a.m. to 9:45 a.m. because a fourth service personnel is available to provide the service from 9:15 a.m. to 9:45 a.m. Accordingly, the cloud-based platform 16 may schedule the new appointment 818 during the time window from 9:15 a.m. to 9:45 a.m.

With respect to new appointment 820, the cloud-based platform 16 has modified the configuration associated with the center to change the start time of new appointments to 9:50 a.m. and the duration of new appointments to 50 minutes. To determine whether new appointment 820 may be scheduled within the time window from 9:50 a.m. to 10:40 a.m., the cloud-based platform may determine the number of existing appointments that overlap or conflict within the time window and determine whether the number of existing appointments within the time window is less than the capacity of the center. As illustrated in FIG. 14, the cloud-based platform 16 may (1) identify that a first number of scheduled appointments that have respective start times before or equal to the start time of the particular time window (i.e., 9:50 a.m.) and respective end times equal to or after the end time of the particular time window (i.e., 10:40 a.m.) is equal to 0; (2) identify that a second number of scheduled appointments 804, 810, 816 that have respective end times after the start time of the particular time window (i.e., 9:50 a.m.) and respective end times before or equal to the end time of the particular time window (i.e., 10:40 a.m.) is equal to 3; and (3) identify that a third number of scheduled appointments 806 that have respective start times equal to or after the start time of the particular time window (i.e., 9:50 a.m.) and respective start times before the end time of the particular time window (i.e., 10:40 a.m.) is equal to 1. The cloud-based platform 16 may then determine that the number of scheduled appointments within the particular time window (i.e., 9:50 a.m. to 10:40 a.m.) is equal to 3 based on the sum of (1) the maximum number between the second number of scheduled appointments and the third number of scheduled appointments, and (2) the first number of scheduled appointments (i.e., max(3, 1)+0). The cloud-based platform 16 may then compare the number of scheduled appointments (i.e., 2) within the particular time window to the capacity of the center within the particular time window to determine whether the cloud-based platform 16 may schedule the new appointment 820 during the particular time window (i.e., 9:50 a.m. to 10:40 a.m.). For instance, if the capacity of the center is 2, the cloud-based platform 16 may determine that that the capacity of the center does not accommodate the new appointment 820 during the particular time window (i.e., 9:50 a.m. to 10:40 a.m.). However, if the capacity of the center is 4 (e.g., as described above with respect to new appointment 818), the cloud-based platform 16 may determine that the capacity of the center accommodates the new appointment 820 and may schedule the new appointment 820 during the particular time window (i.e., 9:50 a.m. to 10:40 a.m.).

With respect to new appointments 822, 824, 826, 828, the cloud-based platform 16 may perform similar techniques described herein to determined whether the new appointments 822, 824, 826, 828 may be scheduled in accordance with respective configurations associated with the center. For instance, as described above, various attributes of the configurations may be modified by the cloud-based platform 16 or by an administrator (via the cloud-based platform 16) to accommodate for the occurrence of one or more events that may affect the availability of providing a service and/or the timing of providing the service at a particular center. In this way, the cloud-based platform 16 may provide a highly flexible tool for automatically modifying configurations associated with providing appointments without manual intervention.

The presently disclosed techniques relate to providing a flexible system for fulfilling demand for one or more services and/or resources provided by a service provider and/or providing access to such services and/or resources to one or more users and/or customers associated with the service provider. In particular, an administrator associated with the service provider may generate one or more configurations associated with providing the services and/or resources at one or more locations during one or more time periods. After the administrator has generated such configurations, the system may generate one or more appointment slots based on the configurations. Such appointment slots may then be displayed to users and/or customers associated with the service provider via a portal such that the users and/or customers may schedule an appointment to receive a service and/or a resource in one or more of the appointment slots. Additionally, or alternatively, the system may automatically schedule an appointment for the users and/or customers based on an applicable configuration. For instance, the administrator may define various attributes of each configuration such that the system applies each configuration to appointment scheduling for receiving a particular service and/or resource at a particular location and/or during a particular time period. In this way, the system provides a high degree of flexibility to the administrator in customizing the availability of various appointments for such services and/or resources by allowing the administrator to tailor each configuration applied by the system with a high degree of granularity. As such, the techniques described herein provide a more robust and flexible mechanism of scheduling appointments than conventional techniques.

Further, after one or more users and/or customers have scheduled appointments for receiving a service and/or a resource in respective appointment slots, one or more events may occur that affect the availability of resources for providing the service and/or the resource or the timing for providing the service and/or the resource. In response to receiving an indication of an occurrence of one or more events, the system may dynamically modify one or more configurations generated by the administrator that govern provision of a service and/or a resource to accommodate the occurrence of the events. For example, the system may dynamically modify the configurations generated by the administrator to automatically prevent overbooking or underbooking of new appointments made by customers after the system received the indication of the occurrence of the events. In this way, the system may automatically modify configurations for providing services and/or resources to customers and/or users without manual intervention to accommodate for changes in circumstances associated with the availability and/or timing of providing such services and/or resources (e.g., in comparison to conventional techniques that provide rigid or fixed appointment scheduling).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a cloud-based platform, comprising:
    a processor; and
    a memory, accessible by the processor, and storing instructions that, when executed by the processor, cause the processor to perform operations comprising:
        transmitting a graphical user interface to a display device, wherein the graphical user interface comprises a list of time windows for scheduling respective service appointments provided by a service provider, and wherein the list of time windows are displayed in the graphical user interface in accordance with one or more attributes associated with a configuration for providing the respective service appointments by the service provider;
        receiving an indication of one or more events associated with the service provider;
        modifying the configuration associated with providing the respective service appointments by the service provider based on the received indication of the one or more events;
        receiving, via the graphical user interface, a request for a new service appointment within a particular time window of the list of time windows after modifying the configuration;
        in response to receiving the request for the new service appointment:
            determining a number of scheduled appointments associated with the particular time window;
            determining whether the number of scheduled appointments is less than a maximum number of appointments associated with the particular time window; and
            automatically scheduling the new service appointment during the particular time window in response to determining that the number of scheduled appointments is less than the maximum number of appointments associated with the particular time window.

2. The system of claim 1, wherein determining the number of scheduled appointments comprises:
    identifying a first number of scheduled appointments that have respective start times before or equal to a start time associated with the particular time window and respective end times equal to or after an end time associated with the particular time window;
    identifying a second number of scheduled appointments that have respective end times (a) after the start time associated with the particular time window and (b) before or equal to the end time associated with the particular time window; and
    identifying a third number of scheduled appointments that have respective start times (a) equal to or after the start time associated with the particular time window and (b) before the end time associated with the particular time window.

3. The system of claim 2, wherein determining the number of scheduled appointments comprises determining a sum of (1) a maximum number between the second number of scheduled appointments and the third number of scheduled appointments and (2) the first number of scheduled appointments.

4. The system of claim 1, wherein the operations comprise:
- identifying a second time window based on the modified configuration in response to determining that the number of scheduled appointments is greater than or equal to the maximum number of appointments associated with the particular time window.

5. The system of claim 4, wherein the operations comprise:
- determining a second number of scheduled appointments associated with the second time window;
- determining whether the second number of scheduled appointments is less than a maximum number of appointments associated with the second time window; and
- automatically scheduling the new service appointment during the second time window in response to determining that the second number of scheduled appointments is less than the maximum number of appointments associated with the second time window.

6. The system of claim 1, wherein the operations comprise preventing scheduling of the new service appointment during the particular time window in response to determining that the number of scheduled appointments is greater than or equal to the maximum number of appointments associated with the particular time window.

7. The system of claim 1, wherein the operations comprise:
- before receiving, via the graphical user interface, the request for the new service appointment within the particular time window:
  - transmitting an updated graphical user interface to the display device, wherein the updated graphical user interface comprises an updated list of time windows comprising the particular time window, and wherein the updated list of time windows are displayed in accordance with one or more attributes associated with the modified configuration.

8. The system of claim 7, wherein the request for the new service appointment within the particular time window is received from the updated graphical user interface.

9. The system of claim 1, wherein modifying the configuration comprises modifying a start date associated with the configuration, an end date associated with the configuration, the maximum number of appointments per time window associated with the configuration, an appointment duration associated with the configuration, a daily start time associated with the configuration, a daily end time associated with the configuration, a set of days per week associated with the configuration, a daily break time associated with the configuration, or a combination thereof.

10. A method, comprising:
- receiving, by a cloud-based platform, an indication of one or more events associated with a service provider;
- modifying, by the cloud-based platform, a configuration associated with providing a schedule of respective service appointments offered by the service provider based on the received indication of the one or more events;
- receiving, by the cloud-based platform, a request for a new service appointment after modifying the configuration;
- in response to receiving the request for the new service appointment:
  - determining, by the cloud-based platform, a number of scheduled appointments associated with a first time window;
  - determining, by the cloud-based platform, whether the number of scheduled appointments is less than a maximum number of appointments associated with the first time window; and
  - automatically scheduling, by the cloud-based platform, the new service appointment during the first time window in response to determining that the number of scheduled appointments is less than the maximum number of appointments associated with the first time window.

11. The method of claim 10, comprising transmitting, by the cloud-based platform, a graphical user interface to a display device, wherein the graphical user interface comprises a list of time windows corresponding to the schedule of the respective service appointments, wherein the list of time windows comprises the first time window.

12. The method of claim 11, wherein the list of time windows are displayed in the graphical user interface in accordance with the configuration before the configuration is modified by the cloud-based platform.

13. The method of claim 11, wherein the request for the new service appointment is received from the graphical user interface.

14. The method of claim 10, wherein determining, by the cloud-based platform, the number of scheduled appointments associated with the first time window comprises:
- identifying a first number of scheduled appointments that have respective start times before or equal to a start time associated with the first time window and respective end times equal to or after an end time associated with the first time window;
- identifying a second number of scheduled appointments that have respective end times (a) after the start time associated with the first time window and (b) before or equal to the end time associated with the first time window; and
- identifying a third number of scheduled appointments that have respective start times (a) equal to or after the start time associated with the first time window and (b) before the end time associated with the first time window.

15. The method of claim 14, wherein determining, by the cloud-based platform, the number of scheduled appointments associated with the first time window comprises determining a sum of (1) a maximum number between the second number of scheduled appointments and the third number of scheduled appointments and (2) the first number of scheduled appointments.

16. A non-transitory, computer readable medium comprising instructions that, when executed by a processor, cause the processor to perform operations comprising:
- transmitting a graphical user interface to a display device, wherein the graphical user interface comprises a list of time windows for scheduling respective service appointments provided by a service provider, and wherein the list of time windows are displayed in the graphical user interface in accordance with one or more attributes associated with a configuration for providing the respective service appointments by the service provider;
- receiving an indication of one or more events associated with the service provider;
- modifying the configuration associated with providing the respective service appointments by the service provider based on the received indication of the one or more events;

transmitting an updated graphical user interface to the display device, wherein the updated graphical user interface comprises an updated list of time windows, and wherein the updated list of time windows are displayed in accordance with one or more attributes associated with the modified configuration;

receiving, via the updated graphical user interface, a request for a new service appointment within a particular time window of the updated list of time windows;

in response to receiving the request for the new service appointment:
  determining a number of scheduled appointments associated with the particular time window;
  determining whether the number of scheduled appointments is less than a maximum number of appointments associated with the particular time window; and
  automatically scheduling the new service appointment during the particular time window in response to determining that the number of scheduled appointments is less than the maximum number of appointments associated with the particular time window.

17. The non-transitory, computer readable medium of claim 16, wherein the operations comprise preventing scheduling of the new service appointment during the particular time window in response to determining that the number of scheduled appointments is greater than or equal to the maximum number of appointments associated with the particular time window.

18. The non-transitory, computer readable medium of claim 16, wherein modifying the configuration comprises modifying a start date associated with the configuration, an end date associated with the configuration, the maximum number of appointments per time window associated with the configuration, an appointment duration associated with the configuration, a daily start time associated with the configuration, a daily end time associated with the configuration, a set of days per week associated with the configuration, a daily break time associated with the configuration, or a combination thereof.

19. The non-transitory, computer readable medium of claim 16, determining the number of scheduled appointments comprises:
  identifying a first number of scheduled appointments that have respective start times before or equal to a start time associated with the particular time window and respective end times equal to or after an end time associated with the particular time window;
  identifying a second number of scheduled appointments that have respective end times (a) after the start time associated with the particular time window and (b) before or equal to the end time associated with the particular time window; and
  identifying a third number of scheduled appointments that have respective start times (a) equal to or after the start time associated with the particular time window and (b) before the end time associated with the particular time window.

20. The non-transitory, computer readable medium of claim 19, wherein determining the number of scheduled appointments comprises determining a sum of (1) a maximum number between the second number of scheduled appointments and the third number of scheduled appointments and (2) the first number of scheduled appointments.

* * * * *